US010277429B2

(12) United States Patent
Sun et al.

(10) Patent No.: US 10,277,429 B2
(45) Date of Patent: Apr. 30, 2019

(54) CODEBOOK INCLUDING PHASE ROTATION BETWEEN LAYERS

(71) Applicant: QUALCOMM Incorporated, San Diego, CA (US)

(72) Inventors: Haitong Sun, San Diego, CA (US); Naga Bhushan, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/625,758

(22) Filed: Jun. 16, 2017

(65) Prior Publication Data

US 2018/0054334 A1 Feb. 22, 2018

Related U.S. Application Data

(60) Provisional application No. 62/377,475, filed on Aug. 19, 2016.

(51) Int. Cl.
*H04J 13/00* (2011.01)
*H04L 25/03* (2006.01)
*H04B 7/0413* (2017.01)

(52) U.S. Cl.
CPC ..... *H04L 25/03929* (2013.01); *H04B 7/0413* (2013.01); *H04J 13/00* (2013.01); *H04J 13/0003* (2013.01); *H04L 25/03936* (2013.01); *H04L 25/03942* (2013.01)

(58) Field of Classification Search
CPC .......................... H04W 72/042; H04L 5/0007
See application file for complete search history.

(56) References Cited

U.S. PATENT DOCUMENTS

| | | | |
|---|---|---|---|
| 2014/0140360 A1 | 5/2014 | Nikopour et al. | |
| 2016/0049999 A1* | 2/2016 | Taherzadeh Boroujeni | ................ H04J 13/16 370/335 |
| 2016/0050039 A1* | 2/2016 | Ma | ........................ H04L 5/0016 370/329 |
| 2016/0072660 A1* | 3/2016 | Nikopour | ................ H04J 13/00 375/298 |

OTHER PUBLICATIONS

Wang Jun et al., "A Novel Codeword Grouped SCMA," 2015 IEEE $6^{th}$ Symposim on Microwave, Antenna, Propagation, and EMC Technologies (MAPE), IEEE, Oct. 28, 2015 (Oct. 28, 2015 ).*

(Continued)

*Primary Examiner* — Ross Varndell
(74) *Attorney, Agent, or Firm* — Loza & Loza LLP

(57) ABSTRACT

Various aspects of the disclosure relate to a codebook design that defines phase rotation on one or more layers of a codebook. This codebook may be used, for example, for sparse code multiple access (SCMA) encoding. One feature pertains to a method of communication that includes receiving at least one input signal, and mapping each of the at least one input signal to a corresponding layer of a codebook, where the codebook defines phase rotation between the layers. The method may further include generating a coded signal for each of the at least one input signal on each corresponding layer based on the codebook, and generating an output signal based on each generated coded signal.

21 Claims, 15 Drawing Sheets

(56) References Cited

OTHER PUBLICATIONS

International Search Report and Written Opinion—PCT/US2017/045607—ISA/EPO—dated Jan. 11, 2018.
Taherzadeh M., et al., "SCMA Codebook Design," IEEE 80th Vehicular Technology Conference (VTC2014-FALL), IEEE, XP032694934, 2014, 5 pages.
Partial International Search Report—PCT/US2017/045607—ISA/EPO—dated Oct. 19, 2017.
Wang J., et al., "A Novel Codeword Grouped SCMA", IEEE 6th International Symposium on Microwave, Antenna, Propagation, and EMC Technologies (MAPE), Oct. 28, 2015, pp. 753-758, XP032923350, DOI: 10.1109/MAPE.2015.751 0426 [retrieved on Jul. 12, 2016].

* cited by examiner

CODEBOOK INCLUDING PHASE ROTATION BETWEEN LAYERS

CROSS-REFERENCE TO RELATED APPLICATION(S)

This application claims priority to and the benefit of provisional patent application No. 62/377,475 filed in the U.S. Patent and Trademark Office on Aug. 19, 2016, the entire content of which is incorporated herein by reference.

INTRODUCTION

Various aspects described herein relate to wireless communication, and more particularly but not exclusively, to a codebook that defines phase rotation on one or more layers of the codebook.

Wireless communication networks are widely deployed to provide various communication services such as telephony, video, data, messaging, broadcasts, and so on. Such networks, which are usually multiple access networks, support communication for multiple users by sharing the available network resources. As the demand for mobile broadband access continues to increase, research and development continue to advance wireless communication technologies not only to meet the growing demand for mobile broadband access, but to advance and enhance the user experience.

Information encoding techniques may be used to encode information for transmission over a network resource (e.g., a time and frequency resource). Orthogonal encoding techniques can provide good performance by sending information over different resources in an orthogonal manner. For example, information from different users may be sent over orthogonal resources (e.g., resources that do not overlap). This enables a receiver to efficiently decode the information associated with a particular user.

In general, it is desirable to send as much information as possible over a given resource. Non-orthogonal encoding techniques may be used to send more information over a given resource (e.g., as compared to orthogonal encoding techniques). However, increasing the amount of information sent on a given resource may make it more difficult for a receiver to accurately decode the received information. Accordingly, there is a need for encoding techniques that can more effectively send information over a resource.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some aspects, the disclosure provides a method for communication including: receiving a first input signal; mapping the first input signal to a first layer of a plurality of layers defined by a codebook, wherein the codebook further defines at least one phase rotation between at least a portion of the layers; generating a first coded signal for the first layer based on the codebook; and generating an output signal based on the first coded signal.

Another aspect of the disclosure provides an apparatus configured for communication that includes a memory and a processor coupled to the memory. The processor and the memory are configured to: receive a first input signal; map the first input signal to a first layer of a plurality of layers defined by a codebook, wherein the codebook further defines at least one phase rotation between at least a portion of the layers; generate a first coded signal for the first layer based on the codebook; and generate an output signal based on the first coded signal.

Another aspect of the disclosure provides an apparatus configured for communication. The apparatus including: means for receiving a first input signal; means for mapping the first input signal to a first layer of a plurality of layers defined by a codebook, wherein the codebook further defines at least one phase rotation between at least a portion of the layers; means for generating a first coded signal for the first layer based on the codebook; and means for generating an output signal based on the first coded signal.

Another aspect of the disclosure provides a non-transitory computer-readable medium storing computer-executable code, including code to: receive a first input signal; map the first input signal to a first layer of a plurality of layers defined by a codebook, wherein the codebook further defines at least one phase rotation between at least a portion of the layers; generate a first coded signal for the first layer based on the codebook; and generate an output signal based on the first coded signal.

In some aspects, the disclosure provides a method for communication including: generating a plurality of symbol error patterns by running a decoder process for each of a plurality of permutations of constellation points between nonzero entities for at least one encoder layer; identifying, for each of the symbol error patterns, a corresponding bit mapping that results in a lowest bit error; defining a plurality of initial codebooks based on each permutation and each corresponding bit mapping; and identifying a final codebook by running a receiver process for each initial codebook and selecting one of the initial codebooks with a highest performance.

Another aspect of the disclosure provides an apparatus configured for communication that includes a memory and a processor coupled to the memory. The processor and the memory are configured to: generate a plurality of symbol error patterns by running a decoder process for each of a plurality of permutations of constellation points between nonzero entities for at least one encoder layer; identify, for each of the symbol error patterns, a corresponding bit mapping that results in a lowest bit error; define a plurality of initial codebooks based on each permutation and each corresponding bit mapping; and identify a final codebook by running a receiver process for each initial codebook and selecting one of the initial codebooks with a highest performance.

Another aspect of the disclosure provides an apparatus configured for communication. The apparatus including: means for generating a plurality of symbol error patterns by running a decoder process for each of a plurality of permutations of constellation points between nonzero entities for at least one encoder layer; means for identifying, for each of the symbol error patterns, a corresponding bit mapping that results in a lowest bit error; means for defining a plurality of initial codebooks based on each permutation and each corresponding bit mapping; and means for identifying a final codebook by running a receiver process for each initial codebook and selecting one of the initial codebooks with a highest performance.

Another aspect of the disclosure provides a non-transitory computer-readable medium storing computer-executable code, including code to: generate a plurality of symbol error patterns by running a decoder process for each of a plurality of permutations of constellation points between nonzero entities for at least one encoder layer; identify, for each of the symbol error patterns, a corresponding bit mapping that results in a lowest bit error; define a plurality of initial codebooks based on each permutation and each corresponding bit mapping; and identify a final codebook by running a receiver process for each initial codebook and selecting one of the initial codebooks with a highest performance.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
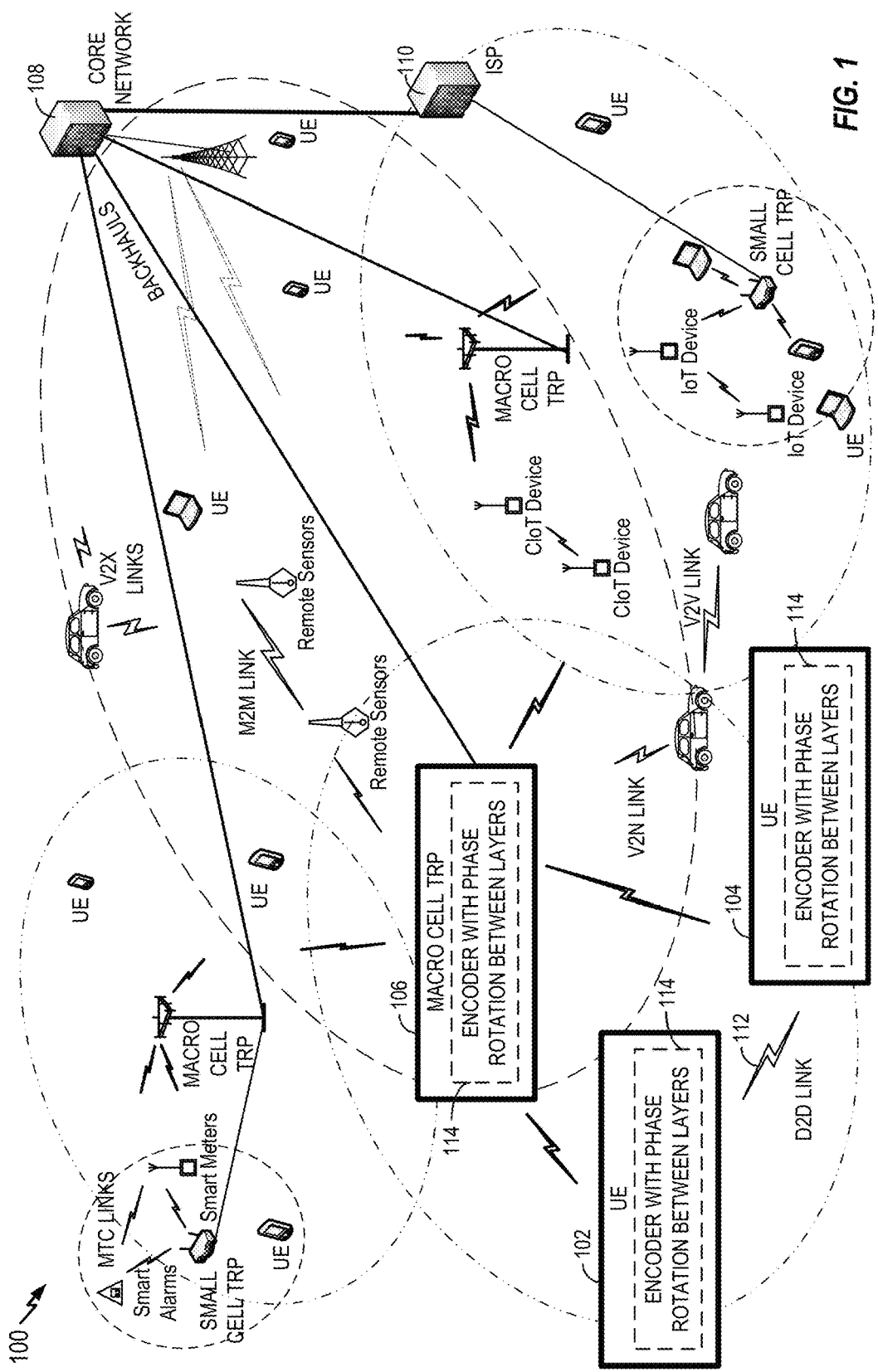
FIG. 1 is a diagram of an example communication system in which aspects of the disclosure may be used.

Various aspects of the disclosure relate to a codebook design that defines phase rotation on one or more layers of a codebook. In some implementations, the codebook is used for sparse code multiple access (SCMA) encoding. In some aspects, a codebook may be designed in a manner that enables multiple users to efficiently use a wireless communication resource. To this end, inputs (e.g., from one or more UEs or some other source or sources), hereafter referred to as layers, may be divided into orthogonal pairs. Phase rotation may then be applied between pairs of layers that are non-orthogonal to one another to maximize the distance between the output symbols. Here, modulation and bit mapping for the codebook may be selected based on symbol decoding error statistics. In addition, the modulation may be further optimized through simulation or some other suitable technique.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

Example Communication System

FIG. 1 illustrates an example of a wireless communication system 100 where a user equipment (UE) can communicate with other devices via wireless communication signaling. For example, a first UE 102 and a second UE 104 may communicate with a transmit receive point (TRP) 106 using wireless communication resources managed by the TRP 106 and/or other network components (e.g., a core network 108, an internet service provider (ISP) 110, peer devices and so on). In some implementations, one or more of the components of the system 100 may communicate with each other directly via a device-to-device (D2D) link 112 or some other similar type of direct link.

Communication of information between two or more of the components of the system 100 may involve encoding the information. For example, the TRP 106 may encode data or control information that the TRP 106 sends to the UE 102 or the UE 104. As another example, the UE 102 may encode data or control information that the UE 102 sends to the TRP 106 or the UE 104. In accordance with the teachings herein, the encoding may involve encoding (e.g., SCMA encoding) that uses a codebook that defines phase rotation between layers of the codebook. Accordingly, one or more of the UE 102, the UE 104, the TRP 106, or some other component of the system 100 may include an encoder with phase rotation between layers 114.

The components and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of network-to-device links and D2D links may be supported in the wireless communication system 100. For example, D2D links may include, without limitation, machine-to-machine (M2M) links, MTC links, vehicle-to-vehicle (V2V) links, and vehicle-to-anything (V2X) links. Network-to-device links may include, without limitation, uplinks (or reverse links), downlinks (or forward links), vehicle-to-network (V2N) links, and V2X links. Broadcast links may include, without limitation, V2V links, V2X links, M2M links, and MTC links. In some aspects, V2V and V2N communication may be considered as examples of V2X communication.

Example Communication Using a Codebook with Phase Rotation

Figure 2:
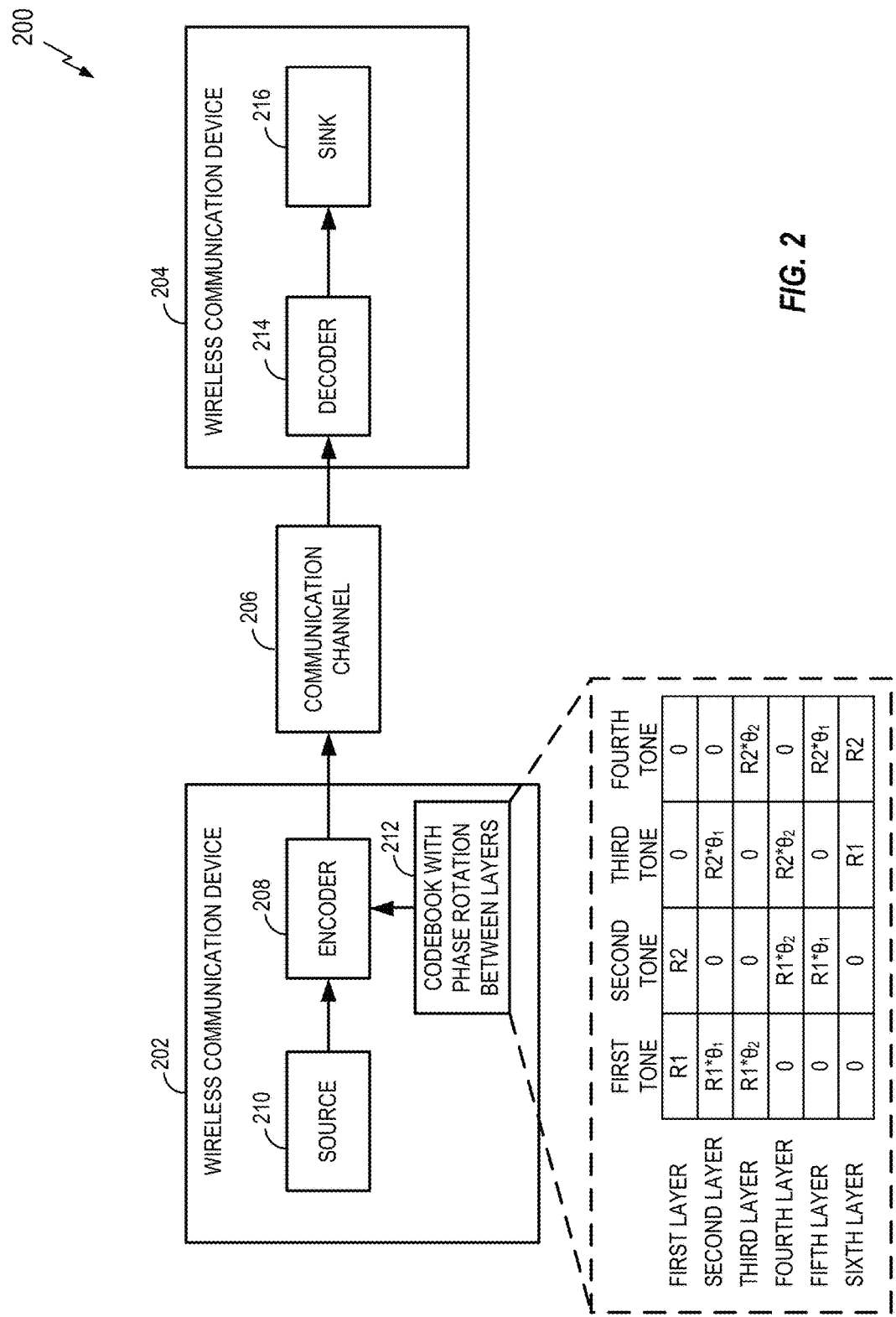
FIG. 2 is a diagram of example communication devices in accordance with some aspects of the disclosure.

FIG. 2 is a schematic illustration of wireless communication system 200 where a first wireless communication device 202 communicates with a second wireless communication device 204. In some implementations, each of the first wireless communication device 202 and the second wireless communication device 204 may correspond to the UE 102, the UE 104, or the TRP 106 of FIG. 1.

In the illustrated example, the first wireless communication device 202 transmits digital information over a communication channel 206 (e.g., a wireless channel) to the second wireless communication device 204. One issue in such a scheme is to efficiently communicate the digital information given that finite resources are available for communication over the communication channel 206 and multiple devices may be contending for those resources.

Coding may be used to provide reliable transmission of digital messages over the communication channel 206, which may be quite noisy in practice. An encoder 208 at the first wireless communication device 202 (a transmitting device, in this example) encodes information from an information source 210 and sends the encoded data over the communication channel 206.

A decoder 214 at the second wireless communication device 204 (a receiving device, in this example) decodes the received encoded data to recover the digital information. The decoder 214 then provides the decoded information to an appropriate information sink 216.

In accordance with the teachings herein, the coding may be based on a codebook 212 that employs phase rotation between layers. The illustrated codebook 212 defines six layers that provide output bits to be transmitted via four tones. For the first tone, a phase rotation of $\theta_1$ is provided on the second layer and a phase rotation of $\theta_2$ is provided on the third layer. Accordingly, the decoder 214 may be able to more effectively decode the information bits output for the first layer, the second layer, and the third layer on the first tone by the encoder 208 (e.g., as compared to information bits received from an encoder that does not use phase rotation between layers).

In general, a codebook may define layers that provide output bits to be transmitted via orthogonal resources. That is, the tones mentioned above are just one example of orthogonal resources that could be used. Orthogonal resources can be created by various means, such as in the frequency domain (e.g., tones), the time domain, the code domain, the spatial domain, or any combination thereof. For purposes of illustration, the examples that follow may simply refer to transmission via tones. It should be appreciated that the teachings herein may be applicable to transmission via other resources as well.

SCMA

Sparse code multiple access (SCMA) is one form of coding that may be used by the communication system 200 in accordance with the teachings herein. SCMA is a non-orthogonal spreading technique. In some aspects, SCMA may use a multi-dimensional codebook (also known as an "integrated codebook") that includes a plurality of individual codebooks each corresponding to a particular layer (e.g., input data stream or source). In such a case, each layer of data uses a different individual codebook of the multi-dimensional codebook. For each codebook, a given input results in a particular output according to the mapping of that codebook. The outputs of the individual codebooks are then combined for transmission over the communication medium.

In general, a layer refers to an input stream applied to a particular codebook. Such a stream may originate from multiple devices (e.g., UEs) or a single device. For each layer, a given bit value applied to the codebook for that layer will map to a particular set of bits being sent over the air on the allocated resources. Thus, in some aspects, the codebook applies a modulation mapping to the incoming bits. Different codebooks may be used for each layer.

As used herein, the term codebook is applicable, in general, to an integrated codebook and/or to an individual codebook. Thus, in the discussion that follows, the term codebook may be used to refer to a multi-dimensional codebook in some cases and an individual codebook in other cases.

Codebook Design

The disclosure relates in some aspects to a codebook design for higher order modulation. In some aspects, such a codebook design may achieve higher spectral efficiency than other codebook designs. For purposes of explanation, various aspects of the codebook design will be described in the context of an SCMA codebook with 3 bits per layer. This design results in a spectral efficiency of up to 4.5 bits/complex symbol. It should be appreciated, however, that the teachings herein may be applied to a different number of bits per layer.

In some aspects, an SCMA codebook with higher order modulation may be relatively complicated. For example, for a (4, 6, 2) code (i.e., 6 layers, 4 resources, 2 nonzero resources) there are 12 nonzero resources, where each resource can have different modulation. Bit mapping also may be more complicated when there is higher order modulation.

Figure 3:
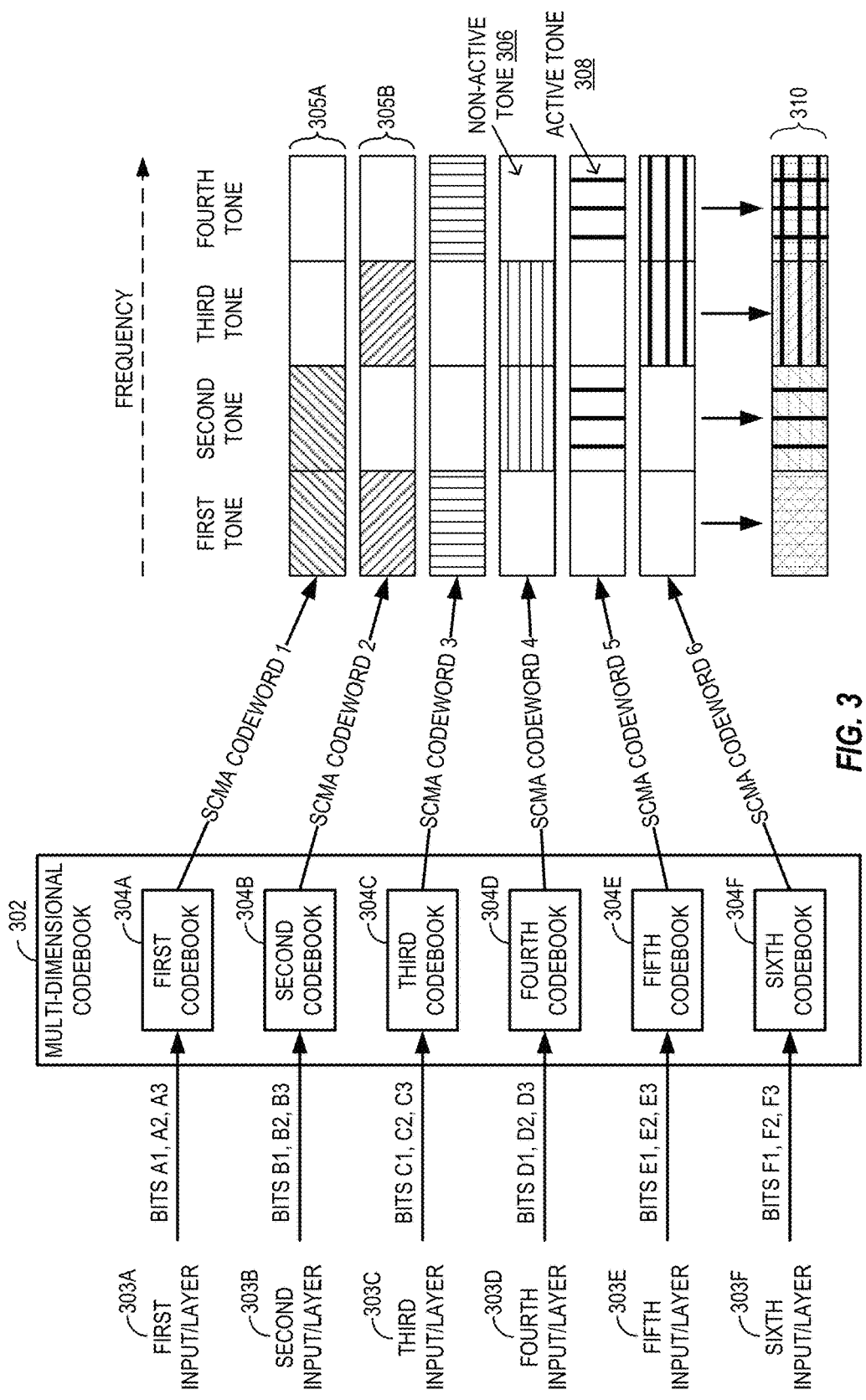
FIG. 3 is a diagram of an example of sparse code multiple access (SCMA) encoding in accordance with some aspects of the disclosure.

FIG. 3 illustrates an example multi-dimensional codebook 302 for a (4, 6, 2) coding scheme. In this example, there are six inputs 303A, 303B, 303C, 303D, 303E, 303F, each of which corresponds to an SCMA layer. The inputs could be from different sources (e.g., UEs) or a single source.

As indicated, the codebook for each layer (e.g., a codebook 304A, 304B, 304C, 304D, 304E, 304F) maps 3 input bits to a particular complex SCMA codeword. Thus, for each layer, a particular 3-bit pattern will map to a particular codeword depending on the mapping provided by the codebook for that layer. For example, the 3 input bits A1, A2, A3 for the first layer (input 303A) are mapped to a particular complex SCMA codeword 305A using the first codebook 304A. As another example, the 3 input bits B1, B2, B3 for the second layer (input 303B) are mapped to a different complex SCMA codeword 305B using the first codebook 304B. In this fashion 3-bit inputs from each layer may be mapped to a different codewords using the different codebooks.

The number of input bits is based in some aspects on the number of information bits that can be reliably sent via each tone. For example, more effective encoding techniques may enable use of a larger number of bits per tone. In some aspects, the performance of such encoding may depend on the degree of sparsity otherwise provided by the codebook.

In the example illustrated in FIG. 3, there are two non-active tones 306 (indicated by the blank boxes) and two active tones 308 (indicated by the patterned boxes) for each codeword. Thus, for each 3-bit input pattern, each input (e.g., each user) is silenced on two of the four output tones thereby providing the sparsity that is desired at the receiver side.

For each tone (e.g., each resource) the layers are superimposed on each other (e.g., in time and frequency) in a non-orthogonal manner. This results in a superimposed complex SCMA codeword 310 of one physical resource element utilizing four tones. This superimposition may occur in various ways. In a scenario where an encoding device encodes multiple inputs, the encoding device may superimpose coded signals for multiple layers. In a scenario where coded signals from multiple encoding devices are received at a decoding device, the superimposition may occur over-the-air. The superimposition could also occur via a combination of these two scenarios.

Figure 4:
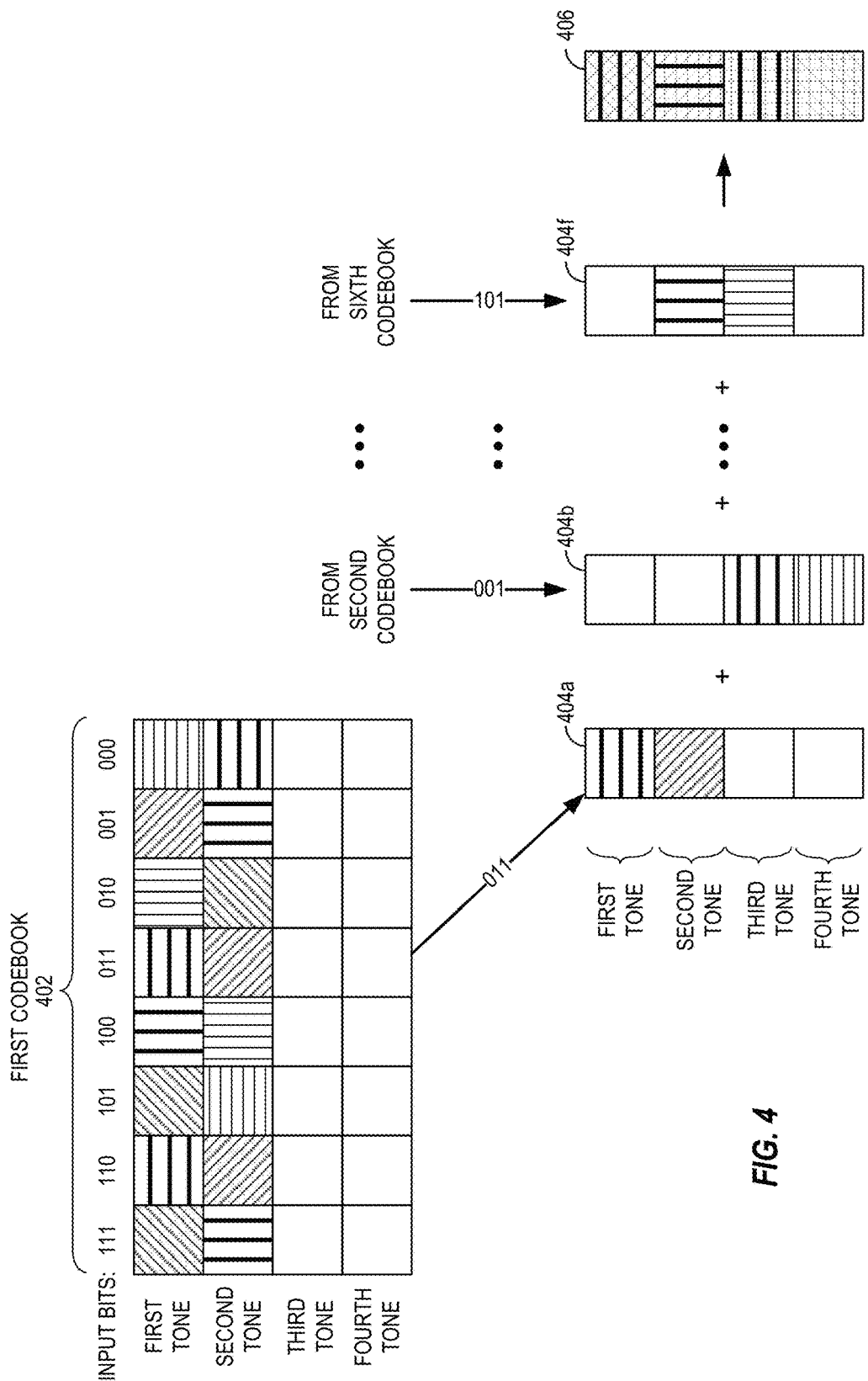
FIG. 4 is a diagram of example SCMA codebooks and SCMA encoding in accordance with some aspects of the disclosure.

FIG. 4 illustrates a simplified example of a first codebook 402 of a multi-dimensional codebook and how codewords from the other codebooks of the multi-dimensional codebook combine to form a superimposed complex SCMA codeword 406. In this example, the first codebook 402 maps a particular 3 bit input (e.g., 000, 001, etc.) to a particular complex output. That is, the first codebook 402 provides a mapping between input bits and multi-dimensional constellation points. Here, each unique pattern in a block of FIG. 4 represents (in an abstract manner) a particular constellation point. As discussed above in conjunction with FIG. 3, for each layer, a particular codeword is selected based on the input bits. In the example of FIG. 4, the first codebook 402 outputs its codeword 404a corresponding to the input bits 011, the second codebook outputs its codeword 404b corresponding to the input bits 001, and so on until the sixth codebook outputs its codeword 404f corresponding to the input bits 101. These codewords 404a, 404b, . . . , 404f are then overlaid at a device (e.g., a TRP) that is transmitting to multiple devices (e.g., UEs) or, in the alternative, overlaid over-the-air by a set of concurrently transmitting devices (e.g., UEs) to provide the superimposed complex codeword 406 to be transmitted. In the latter case, the different devices may use mutually exclusive codebooks of the set of codebooks (the first codebook, the second codebook, etc.). In addition, a particular one of the devices may use one or more of the codebooks depending on the number of inputs at the device.

First Example Codebook

An example structure for an SCMA codebook is set forth in Table 1. This multi-dimensional codebook example includes six codebooks (the last six rows of the table), each of which include four tone entries (the last four columns of the table). Other implementations could use a different number of codebooks and/or tones.

In this example, one of three codebook entry values are used for a given entry of the codebook. Each of these entries is an 8 bit vector in the discussion that follows. The vectors are designated as a vector r0, a vector r1, and a vector r2. Other implementations could use a different number of vectors and/or vectors with a different number of bits.

TABLE 1

| Multi-Dimensional Codebook | | | | |
|---|---|---|---|---|
| codebook [1] = | r1 | r2 | r0 | r0 |
| codebook [2] = | r1 | r0 | r2 | r0 |
| codebook [3] = | r1 | r0 | r0 | r2 |
| codebook [4] = | r0 | r1 | r2 | r0 |
| codebook [5] = | r0 | r1 | r0 | r2 |
| codebook [6] = | r0 | r0 | r1 | r2 |

The vector r0 is all zeros. Thus, this entry may be represented as: r0=zeros (1,8).

The vector r1 specifies for a given input (e.g., 001, 010, etc.), what symbol will be transmitted. In Table 1, the vector r1 specifies amplitude modulation values. For example, the vector r1 either might not specify phase rotation at all (i.e., the vector r1 does not include an imaginary component) or all of the phases within the vector may be the same (e.g., the elements of the vector will all have the same phase). In an example implementation, the vector r1 may be represented as follows: r1=[−7 −5 −3 −1 1 3 5 7]; r1=r1/sqrt (mean (abs (r1)·^2))/sqrt (3). Other values could be used in other implementations.

The vector r2 is the permutation of the vector r1. Thus, this entry may be represented as: r2=permute(r1). This permutation is used to increase the distance between the output symbols of the decoder. For example, the permutation may be selected to get the best spacing between the respective constellation points for the outputs. In other words, while the vector r2 specifies the same amplitude modulation values as the vector r1, the vector r2 maps a given input to a different constellation point to improve the distance.

Figure 5:
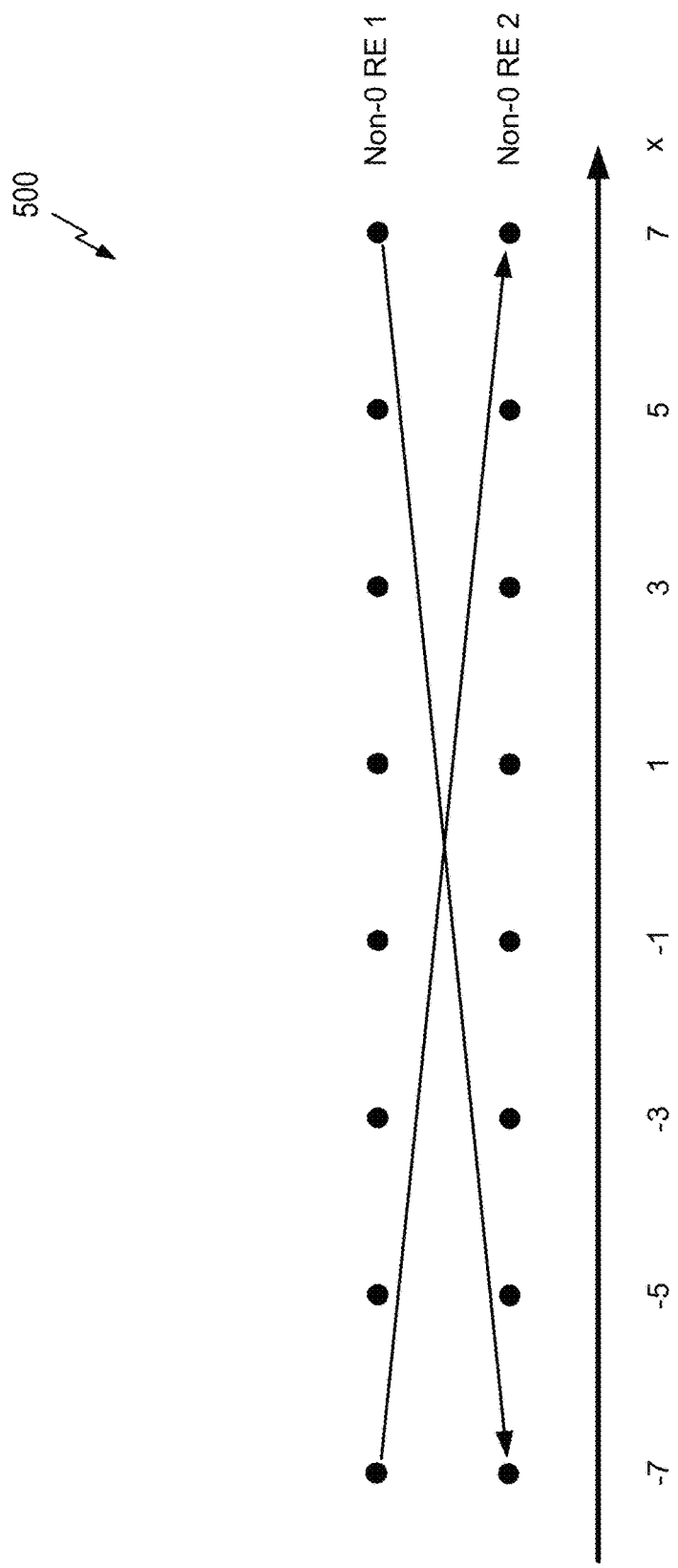
FIG. 5 is a diagram of an example permutation between codebook vectors in accordance with some aspects of the disclosure.

FIG. 5 represents, graphically, an example of a permutation 500 where a first bit of r1 is used as an eighth bit of r2, and where an eighth bit of r1 is used as a first bit of r2. In this case, all of the mapped values are nonzero real numbers (non-0 RE). It should be appreciated that any bit of r1 could be mapped to any bit of r2. Thus, a total of 8! (i.e., 40,320) permutations of r1 to r2 are possible in this example.

As discussed above, each codebook of a multi-dimensional codebook corresponds to a particular codebook layer. Thus, the first codebook (codebook [1]) of Table 1 corresponds to a first layer, the second codebook (codebook [2]) of Table 1 corresponds to a second layer, and so on.

The layers of Table 1 are selected so that some of the layers are orthogonal to one another. For example, since r0=0, each tone for the first layer is orthogonal to each tone for the sixth layer. Similarly, the second layer is orthogonal to the fifth layer, and the third layer is orthogonal to the fourth layer. By using orthogonal layers, bits from different layers are not sent via the same tones. In some aspects, the use of orthogonal layers simplifies the design of the codebook as discussed below.

As Table 1 further indicates, some of the layers are not orthogonal to each other. For example, the first layer is not orthogonal to the second layer, the first layer is not orthogonal to the third layer, and so on. Accordingly, in some aspects, a receiver could have difficulty decoding a signal sent using the codebook of Table 1 since bits from different layers overlap (e.g., would be sent via the same tones) in some cases.

Moreover, in some aspects, the design of each codebook depends on the values selected for mapping input bits to output tones. The selection of these values can include selecting the permutation between the vector r1 and the vector r2, and bit mapping a particular input value (e.g., 010) to a particular vector element (e.g. −7). The above 3 bit-per-layer codebook design may thus involve 8! (i.e., 40,320) operations for permutation and 8! (i.e., 40,320) operations for bit mapping. Consequently, the total number of codebooks to be considered is approximately 1.6e9.

Second Example Codebook

The disclosure relates in some aspects to using phase rotation between layers of a multi-dimensional codebook to increase the distance between symbols output by an encoder. In some aspects, this distance may refer to the numerical difference between complex variables that represent the output signals (e.g., which may be represented by locations in a constellation).

An example structure for an SCMA codebook employing phase rotation in accordance with the teachings herein is set forth in Table 2. The phase rotation is represented by two theta values designated θ_1 (Theta_1) and θ_2 (Theta_2). In this example, $\theta\_1=(60/180)*\pi$ and $\theta\_2=(120/180)*\pi$. Other theta values and/or a different number of theta values could be used in other implementations. The vectors r0, r1, and r2 of Table 2 may be similar to the vectors r0, r1, and r2 of Table 1.

TABLE 2

| Multi-Dimensional Codebook With Phase Rotation Between Layers | | | | |
|---|---|---|---|---|
| codebook [1] = | r1 | r2 | r0 | r0 |
| codebook [2] = | r1*exp(j*θ_1) | r0 | r2*exp (j*θ_1) | r0 |
| codebook [3] = | r1*exp(j*θ_2) | r0 | r0 | r2*exp(j*θ_2) |
| codebook [4] = | r0 | r1*exp(j*θ_2) | r2*exp (j*θ_2) | r0 |
| codebook [5] = | r0 | r1*exp(j*θ_1) | r0 | r2*exp(j*θ_1) |
| codebook [6] = | r0 | r0 | r1 | r2 |

In this example, phase rotation is applied between layers that are not orthogonal to one another to increase the distance between the respective nonzero codebook entries of these non-orthogonal layers. It may be seen that this phase rotation does not affect the orthogonality between the first layer and the sixth layer (layers 1 and 6), between the second layer and the fifth layer (layers 2 and 5), or between the third layer and the fourth layer (layers 3 and 4).

In some aspects, the phase rotations may be selected to maximize the distance between the output symbols. For example, one layer may be rotated by 60 degrees while another layer may be rotated by 120 degrees. In this way, the entries for the first tone from codebooks 1-3 in Table 2 are each offset by 60 degrees. Similarly, for the other tones, any other entry based on the same vector is offset by 60 degrees. For example, for the second tone, the vector r1 entries from codebooks 4 and 5 in Table 2 are offset by 60 degrees.

In the example of Table 2, the same phase rotation is applied to each layer of a pair of orthogonal layers. For example, the vectors r1 and r2 of orthogonal layers 2 and 5 are each rotated by 60 degrees. In addition, the vectors r1 and r2 of orthogonal layers 3 and 4 are each rotated by 120 degrees. Thus, the disclosure relates in some aspects to a multi-dimensional codebook design that reduces the number of codebooks that are independently considered.

Figure 6:
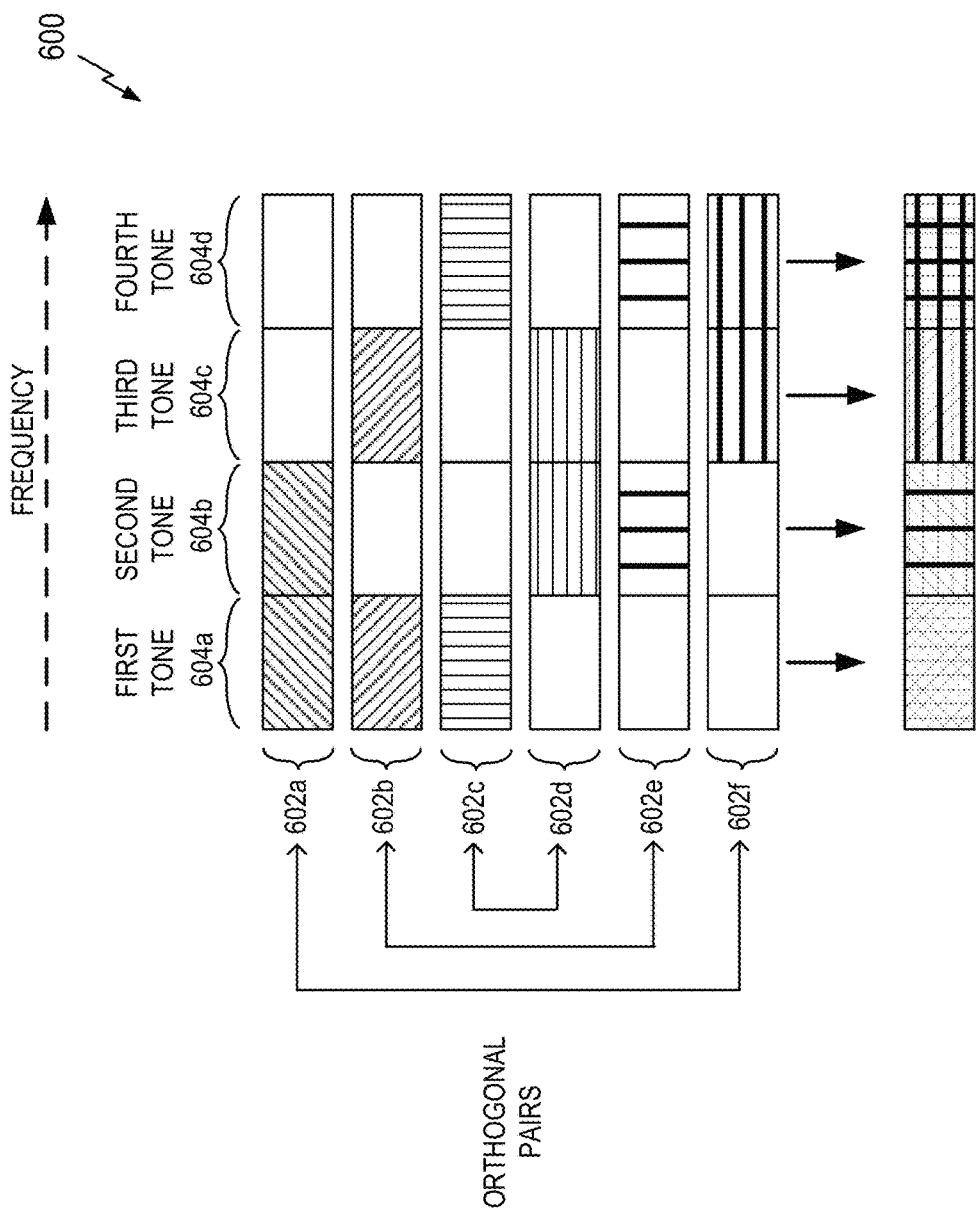
FIG. 6 is a diagram illustrating orthogonal pairs of layers in accordance with some aspects of the disclosure.

FIG. 6 further illustrates orthogonality or lack thereof between layers according to one aspect. Referring to FIG. 6, and as described above with respect to FIG. 3, codewords 602*a*, 602*b*, . . . 602*f* for respective rows of the matrix 600 represents a complex codeword generated from one of six layers that each use a different codebook (see FIG. 3) from the multi-dimensional codebook. Each column represents a different frequency tone that may be either be used by a layer to transmit its codewords (indicated by the patterned boxes) or silent (indicated by a blank box). In the example illustrated, codewords 602*a* generated by the first layer include transmissions that only occupy the first and second tones 604*a*, 604*b*. Conversely, codewords 602*f* generated by the sixth layer include transmissions that only occupy the third and fourth tones 604*c*, 604*d*. Consequently, this pair of layers (i.e., the first layer and the sixth layer) are orthogonal to each other since they do not generate codewords that occupy the same frequency tones. As such, the first and sixth layer may be deemed an orthogonal pair of layers.

Similarly, the codewords 602*b* generated by the second layer include transmissions that only occupy the first and third tones 604*a*, 604*c*, while codewords 602*e* generated by the fifth layer include transmissions that only occupy the second and fourth tones 604*b*, 604*d*. Therefore, the second and fifth layers constitute another pair of orthogonal layers (hereinafter "second pair of orthogonal layers"). The third and fourth layers are also an orthogonal pair since they too generate codewords 602*c*, 602*d* that occupy different tones (hereinafter "third pair of orthogonal layers").

However, since the first layer generates codewords 602*a* that occupy the same tone 604*a* as the second and third layers, the first layer is not orthogonal (i.e., is non-orthogonal) to the second and third layers. Similarly, the first layer generates codewords 602*a* that occupy the same tone 604*b* as the fourth and fifth layers, and thus the first layer is non-orthogonal to the fourth and fifth layers as well. The same reasoning applies to the remaining layers in that the second layer is non-orthogonal to every other layer except the fifth layer, the third layer is non-orthogonal to every other layer except the fourth layer, and vice versa. Therefore, it may be appreciated that the first pair of orthogonal layers including the first and sixth layers is non-orthogonal to the second pair of orthogonal layers and the third pair of orthogonal layers. The second pair of orthogonal layers is also non-orthogonal to the first pair of orthogonal layers and the third pair of orthogonal layers. The third pair of orthogonal layers is non-orthogonal to the first pair of orthogonal layers and the second pair of orthogonal layers.

This orthogonality between pairs of layers may be used advantageously to apply phase rotation to some layers in distinct ways. For example, referring to FIG. 6, the codewords 602*b*, 602*e* generated by the second and fifth layers may be rotated in phase relative to the codewords 602*a*, 602*f* generated by the first and sixth layers. According to one example, the amount of phase rotation applied between these layers may be 45 and 75 degrees such as 60 degrees. Thus, the second pair of orthogonal layers may be phase rotated relative to the first pair of orthogonal layers 45 to 75 degrees including 60 degrees according to one aspect. Similarly, the codewords 602*c*, 602*d* generated by the third and fourth layers may be rotated in phase relative to the codewords 602*a*, 602*f* generated by the first and sixth layers. According to one example, the amount of phase rotation applied between these layers may be 105 and 135 degrees such as 120 degrees. Thus, the third pair of orthogonal layers may be phase rotated relative to the first pair of orthogonal layers 105 to 135 degrees including 120 degrees according to one aspect.

Moreover, since the first and sixth layers are orthogonal to each other in the example shown, no phase rotation may be needed between these layers relative to each other as discussed above. Similarly, no phase rotation may be needed between the second and fifth layers relative to each other or between the third and the fourth layers relative to each other.

The above example of six layers and four tones shown in FIG. 6 and described above is merely exemplary. The concept of grouping orthogonal layers together and phase rotating those groupings relative to other non-orthogonal groupings may be applied to architectures having more or fewer layers and/or more or fewer tones (or other types of resources).

Figure 7:
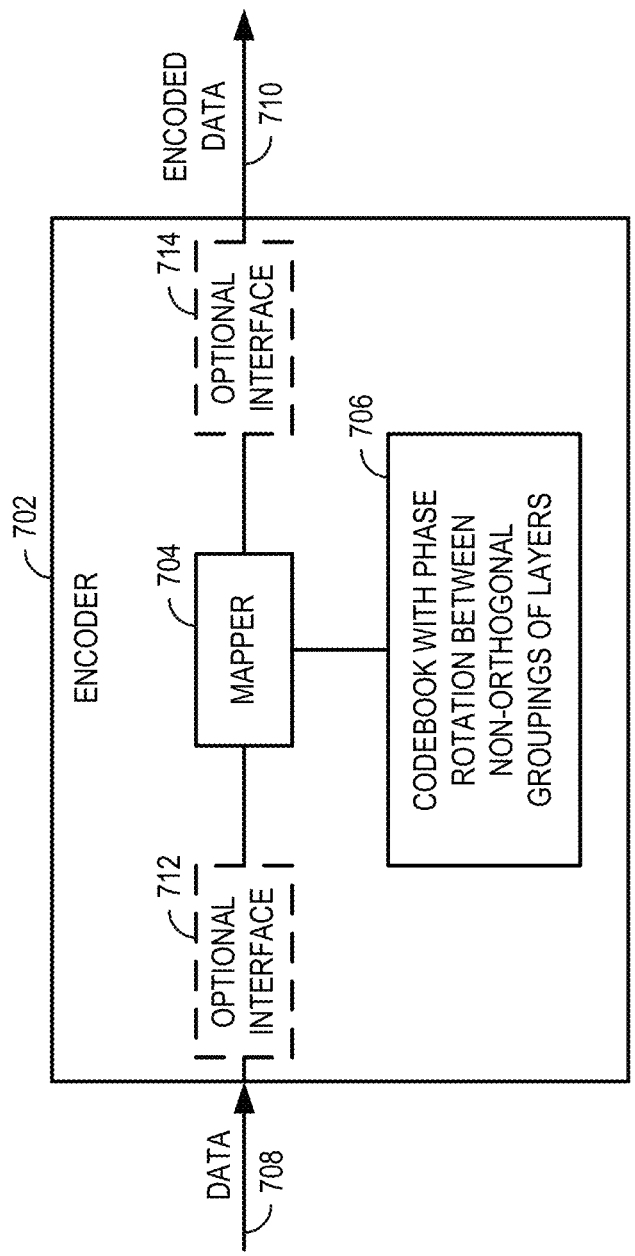
FIG. 7 is a block diagram of an example encoder in accordance with some aspects of the disclosure.

FIG. 7 illustrates an example encoder 702 that uses a codebook as taught herein. A mapper 704 of the encoder 702 uses a codebook 706 to map input data 708 to encoded data 710 (e.g., a complex SCMA codeword). In accordance with the teachings herein, the codebook 706 employs phase rotation between non-orthogonal groupings of layers. For example, a first pair of layers that are orthogonal to each other may be rotated in phase relative to a second pair of layers, in cases where the first pair of layers is not orthogonal to the second pair of layers.

In some implementations, the encoder 702 may include an interface 712, an interface 714, or both. An interface may include, for example, an interface bus, bus drivers, bus receivers, other suitable circuitry, or a combination thereof. For example, the interface 712 may include receiver devices, buffers, or other circuitry for receiving a signal. As another example, the interface 714 may include output devices, drivers, or other circuitry for sending a signal. In some implementations, the interfaces 712 and 714 may be configured to interface the encoder 702 to one or more other components of the encoder 702 (other components not shown in FIG. 7).

The encoder 702 may take different forms in different implementations. In some cases, the encoder 702 may be an integrated circuit. In some cases, the encoder 702 may be included in an integrated circuit that includes other circuitry (e.g., a processor and related circuitry).

Thus, according to one aspect of the disclosure, a codebook may be generated by grouping together, for example in pairs, orthogonal layers and then applying phase rotation between non-orthogonal layer groupings. Next, modulation and bit mapping for the codebook is selected based on symbol decoding error statistics to provide the best performance. The modulation may then be further optimized.

Third Example Codebook

Table 3 illustrates an example of a codebook that results from a search for the best amplitude modulation for the vector r1. For purposes of illustration, this codebook is expressed in a code-based formed.

TABLE 3

Multi-Dimensional Codebook With Phase Rotation Between Layers

θ_1 = (60/180)*π;
θ_2 = (120/180)*π;
r1 = [6.1176, 7.8431, 1.0000, 2.0000, −1.0000, −2.0000, −6.1176, −7.8431];
r1 = r1/sqrt (mean (abs (r1) . ^2))/sqrt (3);
r2 = [2.0000, 1.0000, −6.1176, −7.8431, −6.1176, −7.8431, −2.0000, −1.0000];
r2 = r2/sqrt (mean (abs (r1) . ^2))/sqrt (3);
r0 = zeros (1,8);
codebooks = cell(6,1);

| | | | | |
|---|---|---|---|---|
| codebooks [1] = | r1 | r2 | r0 | r0 |
| codebooks [2] = | r1*exp(j*θ_1) | r0 | r2*exp(j*θ_1) | r0 |
| codebooks [3] = | r1*exp(j*θ_2) | r0 | r0 | r2*exp(j*θ_2) |
| codebooks [4] = | r0 | r1*exp(j*θ_2) | r2*exp(j*θ_2) | r0 |
| codebooks [5] = | r0 | r1*exp(j*θ_1) | r0 | r2*exp(j*θ_1) |
| codebooks [6] = | r0 | r0 | r1 | r2 |

Fourth Example Codebook

The above example can be generalized as follows where phase rotation of layers 2 and 5 relative to layers 1 and 6 may be between 45 degrees and 75 degrees, and phase rotation of layers 3 and 4 relative to layers 1 and 6 may be between 105 degrees and 135 degrees. Table 4 illustrates an example of such a codebook.

TABLE 4

Multi-Dimensional Codebook With Phase Rotation Between Layers

θ_1 = (60±15/80)*π;
θ_2 = (120±15/180)*π;
Theta_1 = 60±15/180*pi;
Theta_2 = 120±15/180*pi;
r0 = [0 0 0 0 0 0 0 0];
r1 = [A B C D E F G H]; r1 = r1/sqrt(mean(abs(r1). ^2))/sqrt(3);
r2 = [I J K L M N O P]; r2 = r2/sqrt(mean(abs(r2). ^2))/sqrt(3), where:
5.6 < A < 6.6;
7.3 < B < 8.3;
0.5 < C < 1.5;
1.5 < D < 2.5;
−1.5 < E < −0.5;
−2.5 < F < −1.5;
−6.6 < G < −5.6;
−8.3 < H < −7.3;
1.5 < I < 2.5;
0.5 < J < 1.5;
−6.6 < K < −5.6;
−8.3 < L < −7.3;
5.6 < M < 6.6;
7.3 < N < 8.3;
−2.5 < O < −1.5;
−1.5 < P < −0.5; and
codebooks = cell(6,1);

| | | | | |
|---|---|---|---|---|
| codebooks [1] = | r1 | r2 | r0 | r0 |
| codebooks [2] = | r1*exp(j*θ_1) | r0 | r2*exp(j*θ_1) | r0 |
| codebooks [3] = | r1*exp(j*θ_2) | r0 | r0 | r2*exp(j*θ_2) |
| codebooks [4] = | r0 | r1*exp(j*θ_2) | r2*exp(j*θ_2) | r0 |
| codebooks [5] = | r0 | r1*exp(j*θ_1) | r0 | r2*exp(j*θ_1) |
| codebooks [6] = | r0 | r0 | r1 | r2 |

Fifth Example Codebook

Another example design involves rotating layers 2 and 5 relative to layers 1 and 6 by 30 degrees, and rotating layers 3 and 4 relative to layers 1 and 6 by 60 degrees. Table 5 illustrates an example of such a codebook.

TABLE 5

Multi-Dimensional Codebook With Phase Rotation Between Layers

θ_1 = (30/180)*π;
θ_2 = (60/180)*π;
r1= [s4 s1 s3 s2 s4 s1 s3 s2]; r1 = r1/sqrt (mean (abs (r1) . ^2))/sqrt (3);
r2= [s4 s1 s3 s2 s4 s1 s3 s2]; r2 = r2/sqrt (mean (abs (r1) . ^2))/sqrt (3);

TABLE 5-continued

Multi-Dimensional Codebook With Phase Rotation Between Layers where:
j = sqrt(−1);
s1 = 1+j; s2 = 1−j; s3 = −1−j; s4 = −1+j;
or:
$$s = \begin{vmatrix} 1 & 0 & 1 & 0 & 1 & 0 \\ 0 & 1 & 1 & 0 & 0 & 1 \\ 1 & 0 & 0 & 1 & 0 & 1 \\ 0 & 1 & 0 & 1 & 1 & 0 \end{vmatrix}$$
r0 = zeros (1,8);
codebooks = cell(6,1);

| | | | | |
|---|---|---|---|---|
| codebooks [1] = | r1 | r2 | r0 | r0 |
| codebooks [2] = | r1*exp(j*θ_1) | r0 | r2*exp(j*θ_1) | r0 |
| codebooks [3] = | r1*exp(j*θ_2) | r0 | r0 | r2*exp(j*θ_2) |
| codebooks [4] = | r0 | r1*exp(j*θ_2) | r2*exp(j*θ_2) | r0 |
| codebooks [5] = | r0 | r1*exp(j*θ_1) | r0 | r2*exp(j*θ_1) |
| codebooks [6] = | r0 | r0 | r1 | r2 |

Example Evaluation Codebook Evaluation

Figure 8:
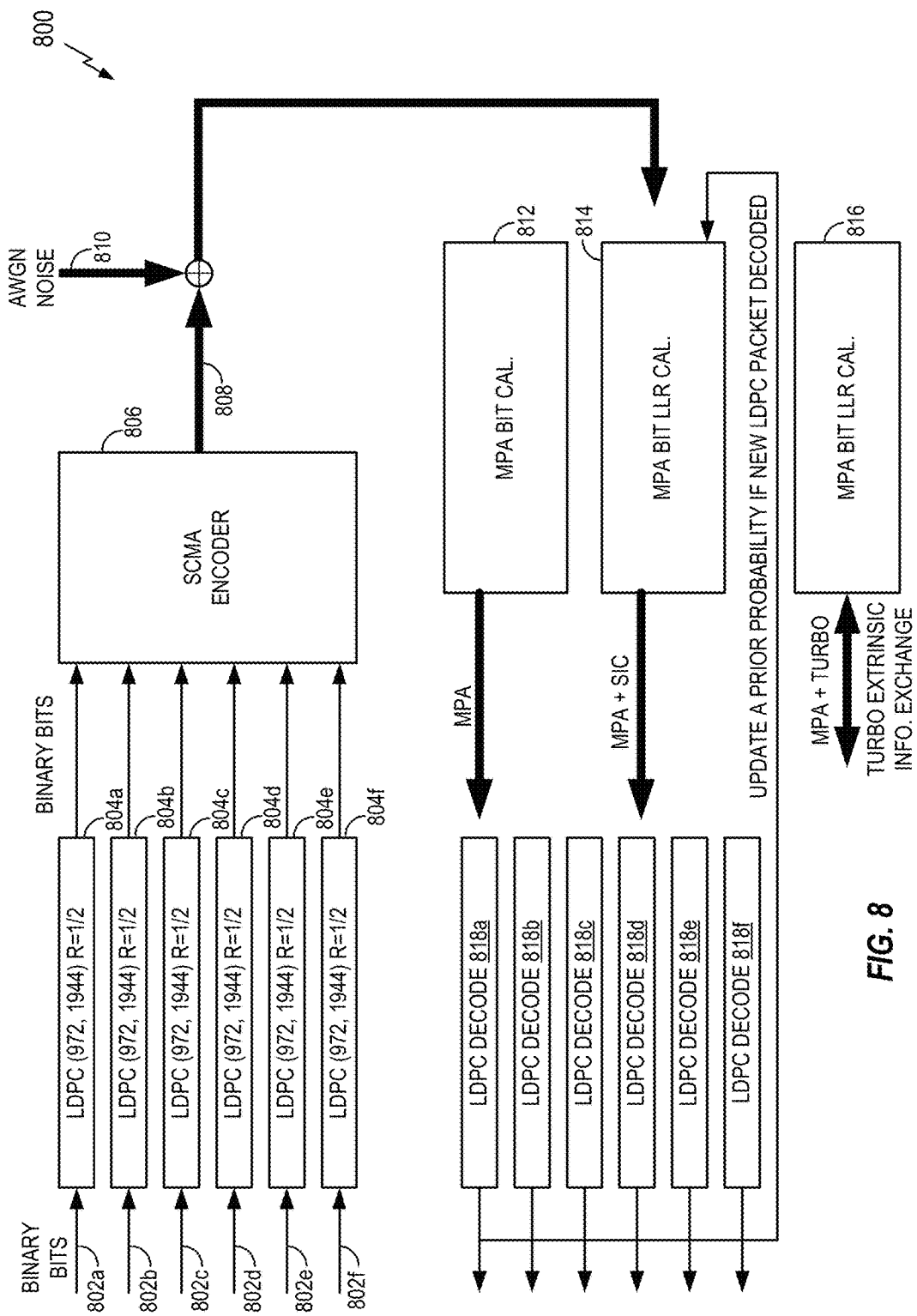
FIG. 8 is a block diagram of example encoder and decoder components in accordance with some aspects of the disclosure.

FIG. 8 illustrates an example evaluation system 800 according to one aspect. Each layer 802a, 802b, 802c, 802d, 802e, 802f uses low density parity check (LDPC) R=½ (972, 1944), where the LDPC code 804a, 804b, 804c, 804d, 804e, 804f is approximately 1.4 dB from a Shannon limit. The outputs from the LDPC are fed to the SCMA encoder 806 which outputs a signal 808 including superimposed complex SCMA codewords. Noise 810 is then added to the signal 808 which is then led to one of three types of receivers: message passing algorithm (MPA) based receiver 812, MPA+successive interference cancellation (SIC) based receiver 814, and MPA+Turbo based receiver 816.

For MPA+SIC 814, MPA is initialized with no symbol a priori information. Once a packet is decoded after the LDPC decoders 818a, 818b, 818c, 818d, 818e, 818f, then a priori information is fully known and MPA is rerun to update the log-likelihood ratio (LLR). The iteration stops when no new packet is decoded. For MPA+Turbo based receiver 816, turbo extrinsic information is exchanged between the MPA (SCMA) decoder and the LDPC decoders 818a, 818b, 818c, 818d, 818e, 818f.

The LDPC decoders 818a, 818b, 818c, 818d, 818e, 818f then recover the original binary bits inputted 802a, 802b, 802c, 802d, 802e, 802f.

Example Codebook Generation Process

Figure 9:
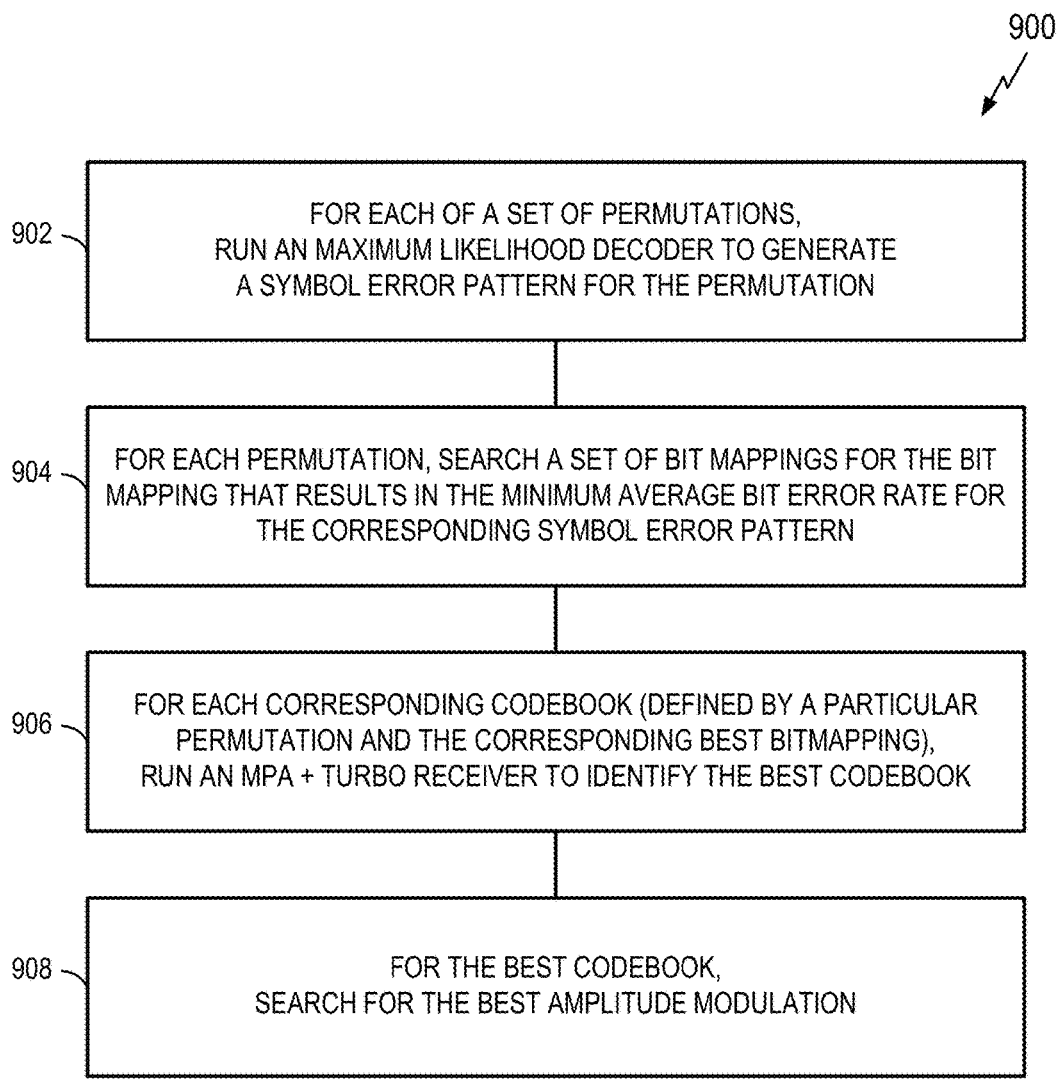
FIG. 9 is a flowchart illustrating an example of a codebook generation process in accordance with some aspects of the disclosure.

FIG. 9 illustrates a process 900 for communication in accordance with some aspects of the disclosure. The process 900 may take place within a processing circuit (e.g., the processing circuit 1410 of FIG. 14), which may be located in a simulation device, a computer, or some other suitable apparatus. Of course, in various aspects within the scope of the disclosure, the process 900 may be implemented by any suitable apparatus capable of supporting codebook generation-related operations.

In some aspects, the process 900 may involve generating a set of possible decoding error statistics for a particular modulation to determine, based on random sequences of input bits for all of the layers, the probability that a particular symbol will be decoded in error (e.g., decoded as another symbol). The process 900 then involves testing each possible bit mapping to identify the bit mapping that gives the best performance. In some aspects, this testing will thus identify the best codeword. In addition, the modulation may be fine-tuned to obtain additional performance improvement.

For purposes of explanation, the process 900 will be described in the context of a system using an R=½ low-density parity check (LDPC) code to design an SCMA 3-bit codebook. This system assumes a channel condition of 1.8 dB from the Shannon limit and decoding by a maximum likelihood (ML) decoder.

At block 902, for each permutation (e.g., 40,320 total), at 1.8 dB from the Shannon limit, the ML decoder is used to generate the symbol error pattern. Thus, block 902 involves generating different sets of symbol error patterns corresponding to the different permutations.

At block 904, for each permutation, a search is conducted over a set of bit mappings for the bit mapping that results in the minimum average bit error rate (BER) for the corresponding symbol error pattern. For example, for each permutation, the best bit mapping may be identified by searching the 40,320 bit mappings. The best bit mapping is the one that gives the minimum average bit error for a particular symbol error pattern.

This results in 40,320 codebooks (as opposed to the 1.6e9 codebooks referenced above). Accordingly, this process is more significantly efficient that the more exhaustive scheme that searches each of the 8! permutations and 8! bit mappings. Each codebook is defined by (e.g., corresponds to) a particular permutation and the corresponding best bit mapping for that permutation.

At block 906, for each particular codebook, an SCMA message passing algorithm (MPA)+Turbo receiver is run to identify the best codebook.

At block 908, once the best codebook is identified, a search for the best amplitude modulation can be conducted. In some cases, this may involve first conducting a coarse search (e.g., to one decimal point), and subsequently conducting finer searches (e.g., to two decimal points, etc.) for the best candidates identified by the coarse search, and so on.

First Example Apparatus

Figure 10:
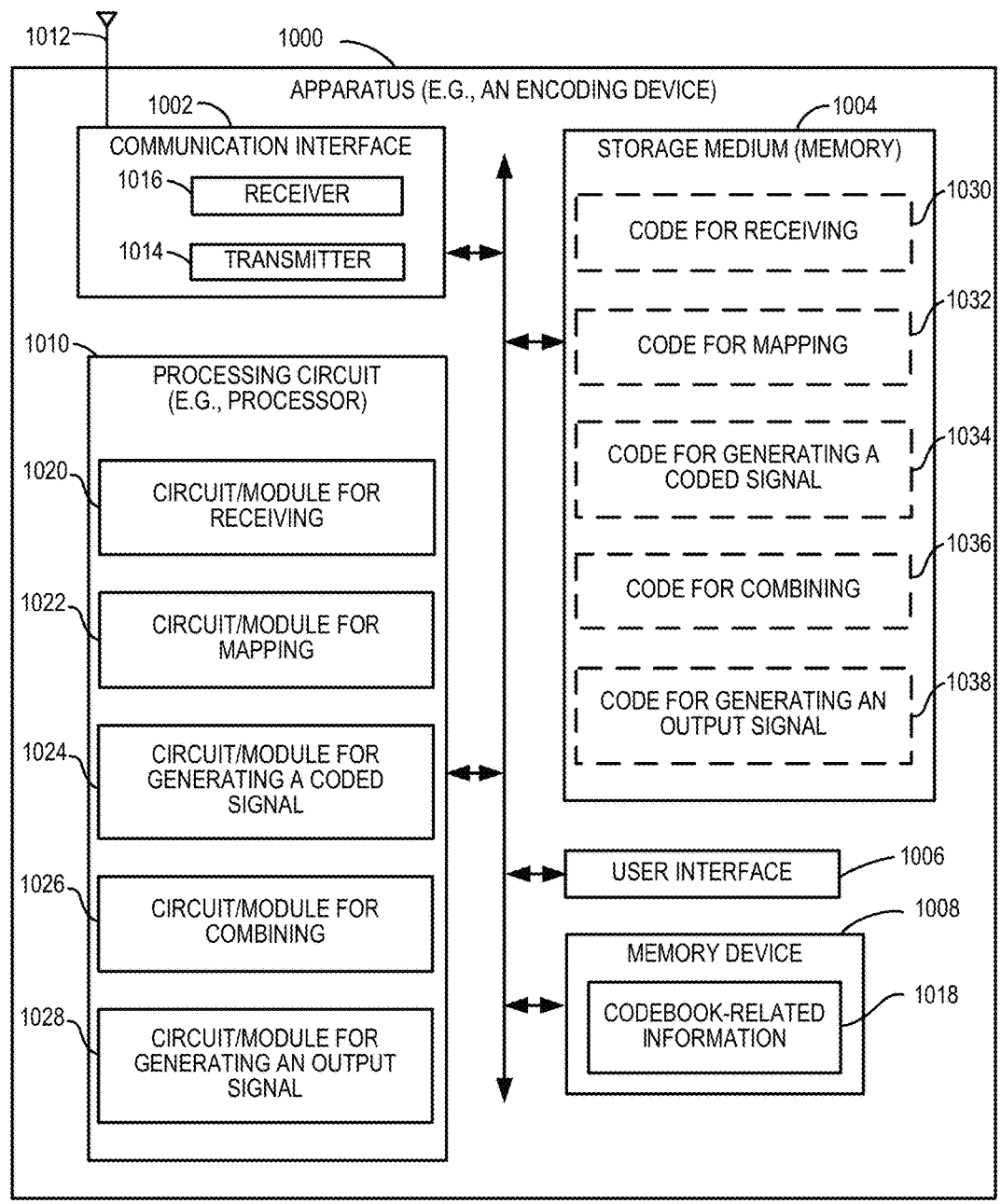
FIG. 10 is a block diagram illustrating an example hardware implementation for an apparatus (e.g., an electronic device) that uses a codebook in accordance with some aspects of the disclosure.

FIG. 10 illustrates a block diagram of an example hardware implementation of an apparatus 1000 configured to communicate (e.g., using a codebook) according to one or more aspects of the disclosure. The apparatus 1000 could embody or be implemented within a UE, a transmit receive point (TRP), a base station, an apparatus including an encoder, or some other type of device that supports silencing as taught herein. In various implementations, the apparatus 1000 could embody or be implemented within an access terminal, an access point, or some other type of device. In various implementations, the apparatus 1000 could embody or be implemented within a mobile phone, a smart phone, a tablet, a portable computer, a server, a network entity, a personal computer, a sensor, an alarm, a vehicle, a machine, an entertainment device, a medical device, or any other electronic device having circuitry.

The apparatus 1000 includes a communication interface 1002 (e.g., at least one transceiver), a storage medium 1004, a user interface 1006, a memory device 1008, and a processing circuit 1010 (e.g., at least one processor). These components can be coupled to and/or placed in electrical communication with one another via a signaling bus or other suitable component, represented generally by the connection lines in FIG. 10. The signaling bus may include any number of interconnecting buses and bridges depending on the specific application of the processing circuit 1010 and the overall design constraints. The signaling bus links together various circuits such that each of the communication interface 1002, the storage medium 1004, the user interface 1006, and the memory device 1008 are coupled to and/or in electrical communication with the processing circuit 1010. The signaling bus may also link various other circuits (not shown) such as timing sources, peripherals, voltage regulators, and power management circuits, which are well known in the art, and therefore, will not be described any further.

The communication interface 1002 may be adapted to facilitate wireless communication of the apparatus 1000. For example, the communication interface 1002 may include circuitry and/or programming adapted to facilitate the communication of information bi-directionally with respect to one or more communication devices in a network. Thus, in some implementations, the communication interface 1002 may be coupled to one or more antennas 1012 for wireless communication within a wireless communication system. In some implementations, the communication interface 1002 may be configured for wire-based communication. For example, the communication interface 1002 could be a bus interface, a send/receive interface, or some other type of signal interface including drivers, buffers, or other circuitry for outputting and/or obtaining signals (e.g., outputting signal from and/or receiving signals into an integrated circuit). The communication interface 1002 can be configured with one or more standalone receivers and/or transmitters, as well as one or more transceivers. In the illustrated example, the communication interface 1002 includes a transmitter 1014 and a receiver 1016.

The memory device 1008 may represent one or more memory devices. As indicated, the memory device 1008 may maintain codebook-related information 1018 along with other information used by the apparatus 1000. In some implementations, the memory device 1008 and the storage medium 1004 are implemented as a common memory component. The memory device 1008 may also be used for storing data that is manipulated by the processing circuit 1010 or some other component of the apparatus 1000.

The storage medium 1004 may represent one or more computer-readable, machine-readable, and/or processor-readable devices for storing programming, such as processor executable code or instructions (e.g., software, firmware), electronic data, databases, or other digital information. The storage medium 1004 may also be used for storing data that is manipulated by the processing circuit 1010 when executing programming. The storage medium 1004 may be any available media that can be accessed by a general purpose or special purpose processor, including portable or fixed storage devices, optical storage devices, and various other mediums capable of storing, containing or carrying programming.

By way of example and not limitation, the storage medium 1004 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1004 may be embodied in an article of manufacture (e.g., a computer program product). By way of example, a computer program product may include a computer-readable medium in packaging materials. In view of the above, in some implementations, the storage medium 1004 may be a non-transitory (e.g., tangible) storage medium.

The storage medium 1004 may be coupled to the processing circuit 1010 such that the processing circuit 1010 can read information from, and write information to, the storage medium 1004. That is, the storage medium 1004 can be coupled to the processing circuit 1010 so that the storage medium 1004 is at least accessible by the processing circuit 1010, including examples where at least one storage medium is integral to the processing circuit 1010 and/or examples where at least one storage medium is separate from the processing circuit 1010 (e.g., resident in the apparatus 1000, external to the apparatus 1000, distributed across multiple entities, etc.).

Programming stored by the storage medium 1004, when executed by the processing circuit 1010, causes the processing circuit 1010 to perform one or more of the various functions and/or process operations described herein. For example, the storage medium 1004 may include operations configured for regulating operations at one or more hardware blocks of the processing circuit 1010, as well as to utilize the communication interface 1002 for wireless communication utilizing their respective communication protocols.

The processing circuit 1010 is generally adapted for processing, including the execution of such programming stored on the storage medium 1004. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1010 is arranged to obtain, process and/or send data, control data access and storage, issue commands, and control other desired operations. The processing circuit 1010 may include circuitry configured to implement desired programming provided by appropriate media in at least one example. For example, the processing circuit 1010 may be implemented as one or more processors, one or more controllers, and/or other structure configured to execute executable programming Examples of the processing circuit 1010 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1010 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1010 are for illustration and other suitable configurations within the scope of the disclosure are also contemplated.

According to one or more aspects of the disclosure, the processing circuit 1010 may be adapted to perform any or all of the features, processes, functions, operations and/or routines for any or all of the apparatuses described herein. For example, the processing circuit 1010 may be configured to perform any of the steps, functions, and/or processes described with respect to FIGS. 1-8 and 11-13. As used herein, the term "adapted" in relation to the processing circuit 1010 may refer to the processing circuit 1010 being one or more of configured, used, implemented, and/or programmed to perform a particular process, function, operation and/or routine according to various features described herein.

The processing circuit 1010 may be a specialized processor, such as an application specific integrated circuit (ASIC) that serves as a means for (e.g., structure for) carrying out any one of the operations described in conjunction with FIGS. 1-8 and 11-13. The processing circuit 1010 may serve as one example of a means for transmitting and/or a means for receiving. In various implementations, the processing circuit 1010 may incorporate, at least in part, the functionality of the first wireless communication device 202 (e.g., the encoder 208) of FIG. 2, the encoder 702 (e.g., the mapper 704) of FIG. 7, or the SCMA encoder 806 of FIG. 8.

According to at least one example of the apparatus 1000, the processing circuit 1010 may include one or more of a circuit/module for receiving 1020, a circuit/module for mapping 1022, a circuit/module for generating a coded signal 1024, a circuit/module for combining 1026, or a circuit/module for generating an output signal 1028. In various implementations, the circuit/module for receiving 1020, the circuit/module for mapping 1022, the circuit/module for generating a coded signal 1024, the circuit/module for combining 1026, or the circuit/module for generating an output signal 1028 may provide, at least in part, the functionality described above for the first wireless communication device 202 (e.g., the encoder 208) of FIG. 2, the encoder 702 (e.g., the mapper 704) of FIG. 7, or the SCMA encoder 806 of FIG. 8.

As mentioned above, programming stored by the storage medium 1004, when executed by the processing circuit 1010, causes the processing circuit 1010 to perform one or more of the various functions and/or process operations described herein. For example, the programming may cause the processing circuit 1010 to perform the various functions, steps, and/or processes described herein with respect to FIGS. 1-8 and 11-13 in various implementations. As shown in FIG. 10, the storage medium 1004 may include one or more of code for receiving 1030, code for mapping 1032, code for generating a coded signal 1034, code for combining 1036, or code for generating an output signal 1038. In various implementations, the code for receiving 1030, the code for mapping 1032, the code for generating a coded signal 1034, the code for combining 1036, or the code for generating an output signal 1038 may be executed or otherwise used to provide the functionality described herein for the circuit/module for receiving 1020, the circuit/module for mapping 1022, the circuit/module for generating a coded signal 1024, the circuit/module for combining 1026, or the circuit/module for generating an output signal 1028.

The circuit/module for receiving 1020 may include circuitry and/or programming (e.g., code for receiving 1030 stored on the storage medium 1004) adapted to perform several functions relating to, for example, receiving at least one input signal. In some aspects, the circuit/module for receiving 1020 may obtain information (e.g., from the communication interface 1002 or some other component of the apparatus 1000) and process (e.g., decode) the information. In some scenarios (e.g., if the circuit/module for receiving 1020 is or includes a radio frequency receiver), the circuit/module for receiving 1020 may receive information directly from a device that transmitted the information. In either case, the circuit/module for receiving 1020 may then output the information to another component of the apparatus 1000 (e.g., the circuit/module for mapping 1022, the memory device 1008 or some other component).

The circuit/module for receiving 1020 (e.g., a means for receiving) may take various forms. In some aspects, the circuit/module for receiving 1020 may correspond to, for example, an interface (e.g., a bus interface, a send/receive interface, or some other type of signal interface), a communication device, a transceiver, a receiver, or some other similar component as discussed herein. In some implementations, the communication interface 1002 includes the circuit/module for receiving 1020 and/or the code for receiving 1030. In some implementations, the circuit/module for receiving 1020 and/or the code for receiving 1030 is configured to control the communication interface 1002 (e.g., a transceiver or a receiver) to receive information.

The circuit/module for mapping 1022 may include circuitry and/or programming (e.g., code for mapping 1032 stored on the storage medium 1004) adapted to perform several functions relating to, for example, mapping an input signal to a corresponding layer of a plurality of layers defined by a codebook, where the codebook defines at least one phase rotation between at least a portion of the layers. In some aspects, the circuit/module for mapping 1022 (e.g., a means for mapping) may correspond to, for example, a processing circuit.

In some aspects, the circuit/module for mapping 1022 may obtain at least one input signal (e.g., from the means for receiving 1020, the memory device 1008, or some other component) and, for each of the at least one input signal, map the input signal to a corresponding layer of the codebook. The circuit/module for mapping 1022 may then generate an output based on the mapping and provide the output to a component of the apparatus 1000 (e.g., the circuit/module for generating a coded signal 1024, the memory device 1008, or some other component).

The circuit/module for generating a coded signal 1024 may include circuitry and/or programming (e.g., code for generating a coded signal 1034 stored on the storage medium 1004) adapted to perform several functions relating to, for example, generating a coded signal for each of the at least one input signal on each corresponding layer based on the codebook. In some aspects, the circuit/module for generating a coded signal 1024 (e.g., a means for generating a coded signal) may correspond to, for example, a processing circuit.

In some aspects, the circuit/module for generating a coded signal 1024 may obtain the codebook (e.g., from the memory device 1008, the circuit/module for mapping 1022, or some other component) and perform an encoding operation (e.g., mapping each particular input signal to a particular encoded signal). The circuit/module for generating a coded signal 1024 may then output each coded signal (e.g., to the circuit/module for combining 1026, the circuit/module for generating an output signal 1028, the memory device 1008, or some other component).

The circuit/module for combining 1026 may include circuitry and/or programming (e.g., code for combining 1036 stored on the storage medium 1004) adapted to perform several functions relating to, for example, combining coded signals generated for a plurality of layers to provide an output signal. In some aspects, the circuit/module for combining 1026 (e.g., a means for combining) may correspond to, for example, a processing circuit.

In some aspects, the circuit/module for combining 1026 may obtain the coded signals (e.g., from the memory device 1008, the circuit/module for generating a coded signal 1024, or some other component) and perform a combining operation (e.g., addition the coded signals for transmission on a common tone). The circuit/module for combining 1026 may then output the output signal (e.g., to the communication interface 1002, the memory device 1008, or some other component).

The circuit/module for generating an output signal 1028 may include circuitry and/or programming (e.g., code for generating an output signal 1038 stored on the storage medium 1004) adapted to perform several functions relating to, for example, providing an output signal for transmission. In some aspects, the circuit/module for generating an output signal 1028 may obtain each coded signal (e.g., from the circuit/module for generating a coded signal 1024, the memory device 1008, or some other component). In the event the at least one signal is a plurality of signals, the circuit/module for generating an output signal 1028 may process (e.g., combine) a plurality of coded signals generated for different layers to provide the output signal (e.g., as discussed above for the circuit/module for combining 1026). In the event the at least one signal is a single signal, the circuit/module for generating an output signal 1028 may process (e.g., encode for transmission) a coded signal generated for a single layer to provide the output signal. The circuit/module for generating an output signal 1028 may thus generate an output signal based on processing of one or more coded signals.

The circuit/module for generating an output signal 1028 (e.g., a means for generating an output signal) may take various forms. In some aspects, the circuit/module for generating an output signal 1028 may correspond to a processing circuit. In some aspects, the circuit/module for generating an output signal 1028 may correspond to, for example, an interface (e.g., a bus interface, a send/receive interface, or some other type of signal interface), a communication device, a transceiver, a transmitter, or some other similar component as discussed herein. In some implementations, the communication interface 1002 includes the circuit/module for generating an output signal 1028 and/or the code for generating an output signal 1038. In some implementations, the circuit/module for generating an output signal 1028 and/or the code for generating an output signal 1038 is configured to control the communication interface 1002 (e.g., a transceiver or a transmitter) to send (e.g., transmit) information.

First Example Process

Figure 11:
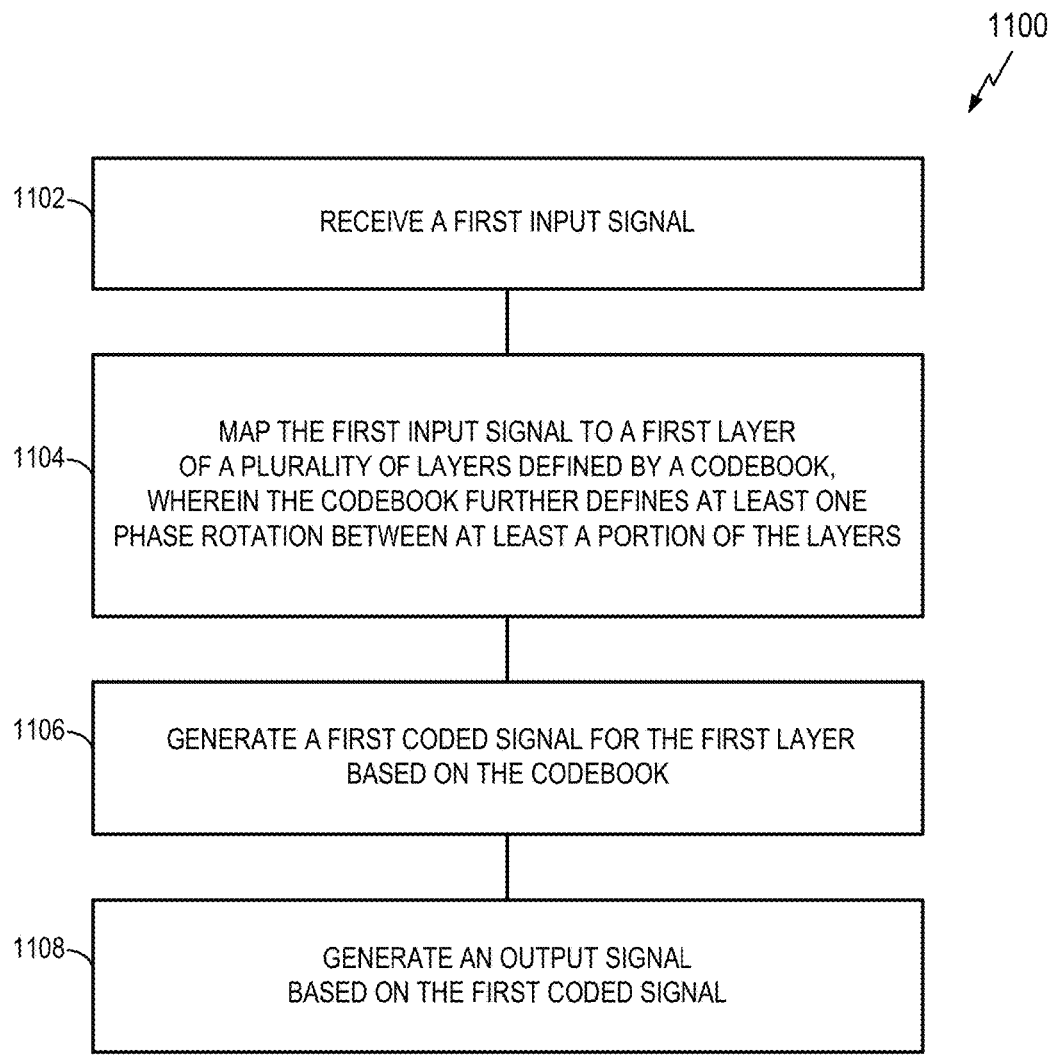
FIG. 11 is a flowchart illustrating an example of an encoding process that uses a codebook in accordance with some aspects of the disclosure.

FIG. 11 illustrates a process 1100 for communication in accordance with some aspects of the disclosure. The process 1100 may take place within a processing circuit (e.g., the processing circuit 1010 of FIG. 10), which may be located in an apparatus including an encoder, an access terminal, a base station, or some other suitable apparatus. Of course, in various aspects within the scope of the disclosure, the process 1100 may be implemented by any suitable apparatus capable of supporting codebook-related operations.

At block 1102, an apparatus (e.g., an apparatus including an encoder) receives a first input signal. For example, the apparatus may receive radiofrequency signals from a wireless communicate device, receive information signals from a receiver, retrieve information from a memory device, or receive signals in some other manner.

In some implementations, the circuit/module for receiving 1020 of FIG. 10 performs the operations of block 1102. In some implementations, the code for receiving 1030 of FIG. 10 is executed to perform the operations of block 1102.

At block 1104, the apparatus maps the first input signal to a first layer of a plurality of layers defined by a codebook, wherein the codebook further defines at least one phase rotation between at least a portion of the layers. For example, if there is one input signal, the apparatus may map the first input signal to the first layer. As another example, if there are two input signals, the apparatus may map the first input signal to the first layer and map a second input signal to a second layer, and so on. In some aspects, mapping between input signals and layers may be mutually exclusive. For example, the first input signal might only be mapped to the first layer and a second input signal might only be mapped to a second layer, where only one input signal is mapped to each layer. Different numbers of layers, different numbers of input signals, and different mappings may be used in different scenarios.

In accordance with the teaching herein, the codebook may further define at least one phase rotation between at least a portion of the layers. For example, and without limitation, for the six layer codebook 212 of FIG. 2, phase rotations may be applied to layers two, three, four, and five.

In some implementations, the circuit/module for mapping 1022 of FIG. 10 performs the operations of block 1104. In some implementations, the code for mapping 1032 of FIG. 10 is executed to perform the operations of block 1104.

At block 1106, the apparatus generates a first coded signal for the first layer based on the codebook. For example, if there is one layer (corresponding to one input signal), the apparatus may generate a coded signal for the one layer. As another example, if there are two layers (corresponding to two input signals), the apparatus may generate the first coded signal for the first layer and a second coded signal for a second layer, and so on.

In some implementations, the circuit/module for generating a coded signal 1024 of FIG. 10 performs the operations of block 1106. In some implementations, the code for generating a coded signal 1034 of FIG. 10 is executed to perform the operations of block 1106.

At block 1108, the apparatus generates an output signal based on the first coded signal. For example, the apparatus may generate an output signal from one coded signal for one layer or from a plurality of coded signals for a plurality of layers.

In some implementations, the circuit/module for generating an output signal 1028 of FIG. 10 performs the operations of block 1108. In some implementations, the code for generating an output signal 1038 of FIG. 10 is executed to perform the operations of block 1108.

The codebook may take different forms in different implementations. In some aspects, the codebook may be any of the codebooks described herein. In some aspects, the codebook may be a sparse code multiple access (SCMA) codebook. In some aspects, the codebook may define, for each of the layers, a mapping between input bits and multi-dimensional constellation points. In some aspects, the codebook may define, for each of the layers, a permutation of constellation points between each nonzero entry of the layer.

The phase rotation may take different forms in different implementations. In some aspects, a given phase rotation of the at least one phase rotation may be between 45 degrees and 75 degrees or between 105 degrees and 135 degrees. In some aspects, each phase rotation may be 60 degrees or 120 degrees. In some aspects, each phase rotation may be approximately (e.g., substantially) 60 degrees or approximately (e.g., substantially) 120 degrees. In some aspects, each phase rotation may be approximately (e.g., substantially) between 45 degrees to 75 degrees or approximately (e.g., substantially) between 105 degrees to 135 degrees. In some aspects, each phase rotation might not be applied between layers of an orthogonal pair of layers.

The layers may take different forms in different implementations. In some aspects, the layers may include a plurality of pairs of orthogonal layers; and each pair of orthogonal layers may include one layer that is orthogonal to the other layer. In this case, each pair of orthogonal layers may be non-orthogonal to every other pair of orthogonal layers; and the definition of at least one phase rotation between at least a portion of the layers may include at least one definition of a nonzero phase rotation value for at least one of the pairs of orthogonal layers relative to at least another one of the pairs of orthogonal layers.

In some aspects, the plurality of layers may include a first layer, a second layer, a third layer, and a fourth layer; where the first layer, the second layer, the third layer, and the fourth layer are each associated with a plurality of orthogonal resources; and where, for each tone of the plurality of orthogonal resources, the first layer is orthogonal to the second layer and the third layer is orthogonal to the fourth layer. In this case, the first layer and the second layer may include a first orthogonal layer pair; the third layer and the fourth layer may include a second orthogonal layer pair; the first orthogonal layer pair may be non-orthogonal to the second orthogonal layer pair; and the at least one phase rotation may be between the first orthogonal layer pair and the second orthogonal layer pair. Alternatively, or in addition, the first layer may be non-orthogonal to the third layer and the fourth layer; the second layer may be non-orthogonal to the third layer and the fourth layer; a first phase rotation of the at least one phase rotation may be between the first layer and the third layer; and a second phase rotation of the at least one phase rotation may be between the second layer and the fourth layer. Alternatively, or in addition, the codebook may further define amplitude modulation for each of the first layer, the second layer, the third layer, and the fourth layer; and the at least one phase rotation may include at least one phase modulation for each of the third layer and the fourth layer. Alternatively, or in addition, the codebook may further define a first nonzero value and a second nonzero value for each of the first layer, the second layer, the third layer, and the fourth layer; and the at least one phase rotation may include at least one phase rotation of the first nonzero value and the second nonzero value for each of the third layer and the fourth layer.

In some aspects, the plurality of layers may include a first layer, a second layer, a third layer, a fourth layer, a fifth layer, and a sixth layer; where the first layer, the second layer, the third layer, the fourth layer, the fifth layer, and the sixth layer are each associated with a first tone, a second tone, a third tone, and a fourth tone; and where, for each tone of the first tone, the second tone, the third tone, and the fourth tone, the first layer is orthogonal to the sixth layer, the second layer is orthogonal to the fifth layer, and the third layer is orthogonal to the fourth layer. In this case, the first layer may be non-orthogonal to the second layer, the third layer, the fourth layer, and the fifth layer; the second layer may be non-orthogonal to the third layer, the fourth layer, and the sixth layer; the third layer may be non-orthogonal to the fifth layer and the sixth layer; the fourth layer may be non-orthogonal to the fifth layer and the sixth layer; and the fifth layer may be non-orthogonal to the sixth layer. In some aspects, at least one first phase rotation of the at least one phase rotation may be for the first tone and may be between the first layer, the second layer, and the third layer; a second phase rotation of the at least one phase rotation may be for the second tone and may be between the fourth layer and the fifth layer; a third phase rotation of the at least one phase rotation may be for the third tone and may be between the second layer and the fourth layer; and at least one fourth phase rotation of the at least one phase rotation may be for the fourth tone and may be between the third layer, the fifth layer, and the sixth layer.

For example, a first layer may be orthogonal to a second layer and non-orthogonal to a third layer. As another example, a first layer may be orthogonal to a second layer and a third layer may be non-orthogonal to a fourth layer. Other combinations are possible. In some aspects, the codebook defines phase rotation between the non-orthogonal layers and phase rotation is not applied between the orthogonal layers.

In some aspects, at least one input signal may include (e.g., may be) a plurality of input signals. In this case, generation, for each corresponding layer, of a coded signal based on the codebook may include generating, for each of the plurality of layers, a coded signal based on the codebook. In addition, the generation of the output signal may include combining the coded signals generated for the plurality of layers to provide the output signal.

In some aspects, at least one input signal may include (e.g., may be) one input signal. In this case, generation, for each corresponding layer, of a coded signal based on the codebook may include generating, for one of the plurality of layers, one coded signal based on the codebook. In addition, the generation of the output signal may be based on the one coded signal in this case.

In some aspects, the process 1100 may include any combination of two or more of the above features.

Second Example Process

Figure 12:
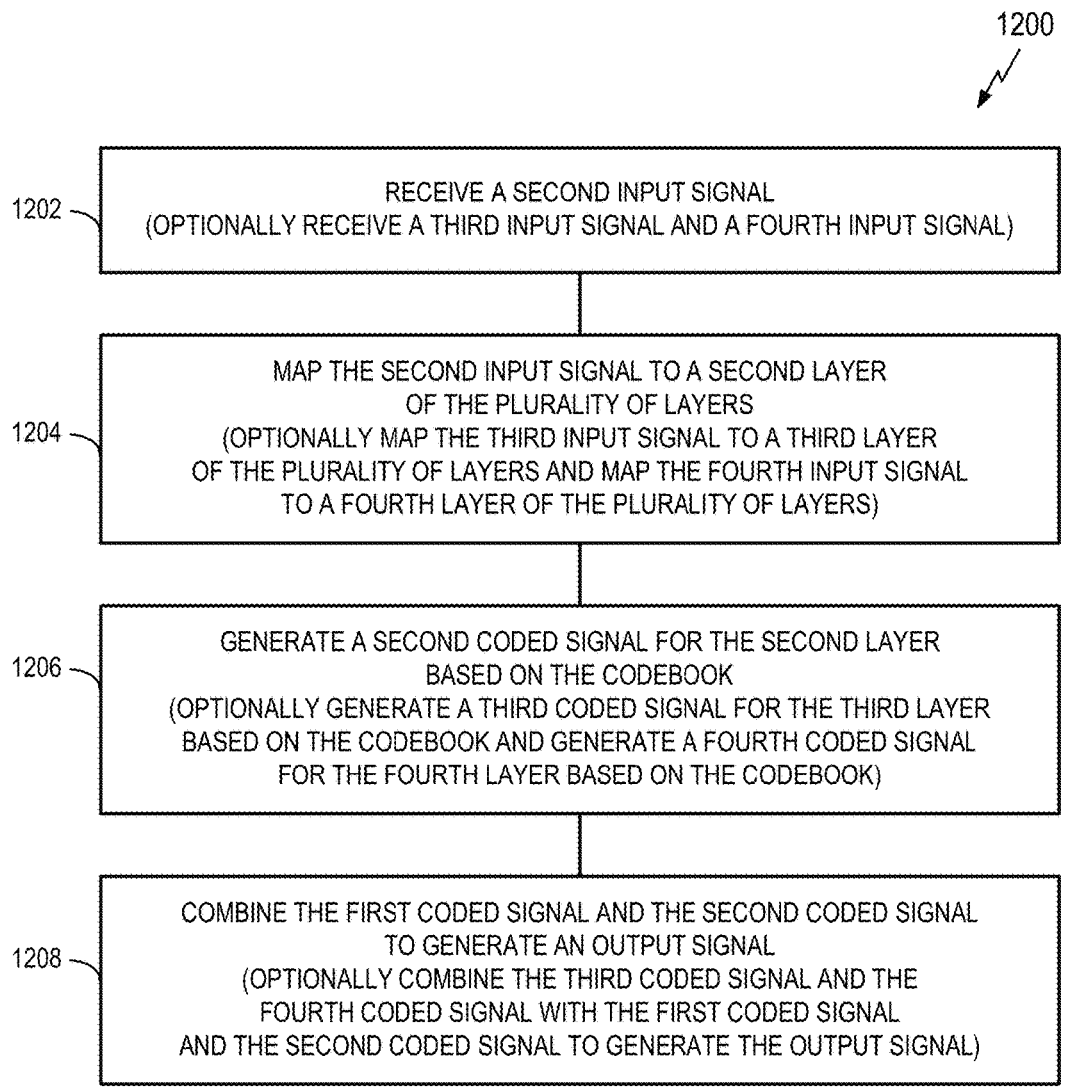
FIG. 12 is a flowchart illustrating additional encoding operations that use a codebook in accordance with some aspects of the disclosure.

FIG. 12 illustrates a process 1200 for communication in accordance with some aspects of the disclosure. In some aspects, the process 1200 may be performed in conjunction with (e.g., as part of or in addition to) the process 1100 of FIG. 11. The process 1200 may take place within a processing circuit (e.g., the processing circuit 1010 of FIG. 10), which may be located in an apparatus including an encoder, an access terminal, a base station, or some other suitable apparatus. Of course, in various aspects within the scope of the disclosure, the process 1200 may be implemented by any suitable apparatus capable of supporting codebook-related operations.

At block 1202, an apparatus (e.g., an apparatus including an encoder) receives a second input signal. In addition, in some scenarios, the apparatus may also receive a third input signal and a fourth input signal. For example, the apparatus may receive radiofrequency signals from a wireless communicate device, receive information signals from a receiver, retrieve information from a memory device, or receive signals in some other manner.

In some implementations, the circuit/module for receiving 1020 of FIG. 10 performs the operations of block 1202. In some implementations, the code for receiving 1030 of FIG. 10 is executed to perform the operations of block 1202.

At block 1204, the apparatus maps the second input signal to a second layer of the plurality of layers (e.g., the layers of the process 1100 of FIG. 11). In addition, in some scenarios, the apparatus may also map the third input signal to a third layer of the plurality of layers and map the fourth input signal to a fourth layer of the plurality of layers.

In some implementations, the circuit/module for mapping 1022 of FIG. 10 performs the operations of block 1204. In some implementations, the code for mapping 1032 of FIG. 10 is executed to perform the operations of block 1204.

At block 1206, the apparatus generates a second coded signal for the second layer based on the codebook. In addition, in some scenarios, the apparatus may also generate a third coded signal for the third layer based on the codebook and generate a fourth coded signal for the fourth layer based on the codebook.

In some implementations, the circuit/module for generating a coded signal 1024 of FIG. 10 performs the operations of block 1206. In some implementations, the code for generating a coded signal 1034 of FIG. 10 is executed to perform the operations of block 1206.

At block 1208, the apparatus combines the first coded signal (e.g., of the process 1100 of FIG. 11) and the second coded signal to generate an output signal. In addition, in some scenarios, the apparatus may combine the third coded signal and the fourth coded signal with the first coded signal and the second coded signal to generate the output signal.

In some implementations, the circuit/module for combining 1026 of FIG. 10 performs the operations of block 1208. In some implementations, the code for combining 1036 of FIG. 10 is executed to perform the operations of block 1208.

In some aspects, the process 1200 may include any combination of two or more of the above features.

Third Example Process

Figure 13:
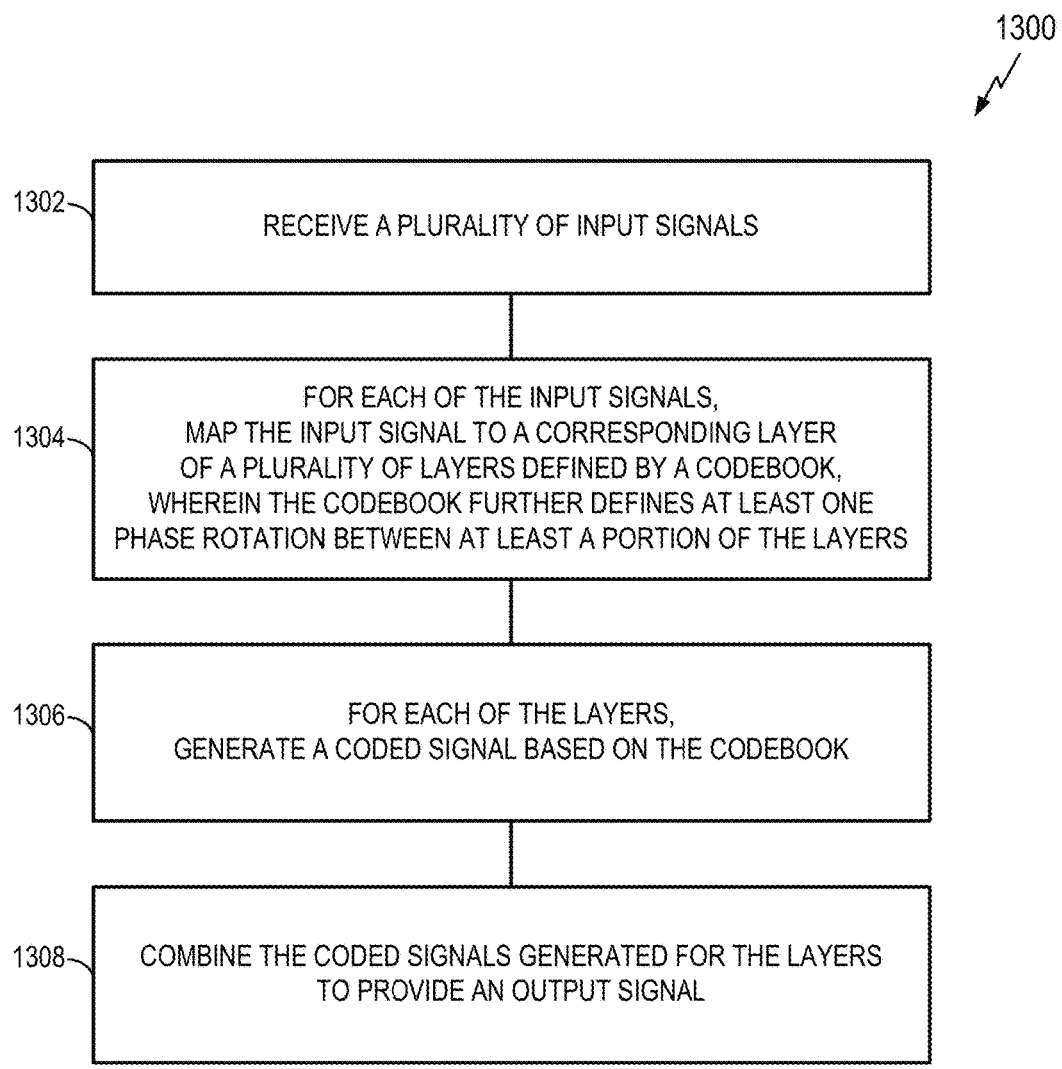
FIG. 13 is a flowchart illustrating another example of an encoding process that uses a codebook in accordance with some aspects of the disclosure.

FIG. 13 illustrates a process 1300 for communication in accordance with some aspects of the disclosure. The process 1300 may take place within a processing circuit (e.g., the processing circuit 1010 of FIG. 10), which may be located in an apparatus including an encoder, an access terminal, a base station, or some other suitable apparatus. Of course, in various aspects within the scope of the disclosure, the process 1300 may be implemented by any suitable apparatus capable of supporting codebook-related operations.

At block 1302, an apparatus (e.g., an apparatus including an encoder) receives a plurality of input signals. For example, the apparatus may receive radiofrequency signals from a wireless communicate device, receive information signals from a receiver, retrieve information from a memory device, or receive signals in some other manner.

In some implementations, the circuit/module for receiving 1020 of FIG. 10 performs the operations of block 1302. In some implementations, the code for receiving 1030 of FIG. 10 is executed to perform the operations of block 1302.

At block 1304, for each of the input signals, the apparatus maps the input signal to a corresponding layer of a plurality of layers defined by a codebook, wherein the codebook further defines at least one phase rotation between at least a portion of the layers. In some aspects, this mapping between input signals and layers may be mutually exclusive. For example, a first input signal might only be mapped to a first layer and a second input might only be mapped to a second layer, where only one input signal is mapped to each layer. Different numbers of layers, different numbers of input signals, and different mappings may be used in different scenarios.

In some implementations, the circuit/module for mapping 1022 of FIG. 10 performs the operations of block 1304. In some implementations, the code for mapping 1032 of FIG. 10 is executed to perform the operations of block 1304.

At block 1306, for each of the layers, the apparatus generates a coded signal based on the codebook. In some implementations, the circuit/module for generating a coded signal 1024 of FIG. 10 performs the operations of block 1306. In some implementations, the code for generating a coded signal 1034 of FIG. 10 is executed to perform the operations of block 1306.

At block 1308, the apparatus combines the coded signals generated for the layers to provide an output signal. In some implementations, the circuit/module for combining 1026 of FIG. 10 performs the operations of block 1308. In some implementations, the code for combining 1036 of FIG. 10 is executed to perform the operations of block 1308.

The codebook may take different forms in different implementations. In some aspects, the codebook may be any of the codebooks described herein. In some aspects, the codebook may be a sparse code multiple access (SCMA) codebook. In some aspects, the codebook may define, for each of the layers, a mapping between input bits of a corresponding one the input signals and multi-dimensional constellation points. In some aspects, the codebook may define, for each of the layers, a permutation of constellation points between each nonzero entry of the layer.

The phase rotation may take different forms in different implementations. In some aspects, each phase rotation may be 60 degrees or 120 degrees. In some aspects, each phase rotation may be approximately (e.g., substantially) 60 degrees or approximately (e.g., substantially) 120 degrees. In some aspects, each phase rotation may be approximately (e.g., substantially) between 45 degrees to 75 degrees or approximately (e.g., substantially) between 105 degrees to 135 degrees. In some aspects, each phase rotation might not be applied between layers of an orthogonal pair of layers.

The layers may take different forms in different implementations. In some aspects, the layers may include a plurality of pairs of orthogonal layers; and each pair of orthogonal layers may include a first layer that is orthogonal to a second layer. In this case, each pair of orthogonal layers may be non-orthogonal to every other pair of orthogonal layers; and the definition of at least one phase rotation between at least a portion of the layers may include at least one definition of a nonzero phase rotation value for at least one of the pairs of orthogonal layers relative to at least another one of the pairs of orthogonal layers.

In some aspects, the plurality of layers may include a first layer, a second layer, a third layer, and a fourth layer; where the first layer, the second layer, the third layer, and the fourth layer are each associated with a plurality of tones; and where, for each tone of the plurality of tones, the first layer is orthogonal to the second layer and the third layer is orthogonal to the fourth layer. In this case, the first layer and the second layer may include a first orthogonal layer pair; the third layer and the fourth layer may include a second orthogonal layer pair; the first orthogonal layer pair may be non-orthogonal to the second orthogonal layer pair; and the at least one phase rotation may be between the first orthogonal layer pair and the second orthogonal layer pair. Alternatively, or in addition, the first layer may be non-orthogonal to the third layer and the fourth layer; the second layer may be non-orthogonal to the third layer and the fourth layer; a first phase rotation of the at least one phase rotation may be between the first layer and the third layer; and a second phase rotation of the at least one phase rotation may be between the second layer and the fourth layer. Alternatively, or in addition, the codebook may further define amplitude modulation for each of the first layer, the second layer, the third layer, and the fourth layer; and the at least one phase rotation may include at least one phase modulation for each of the third layer and the fourth layer. Alternatively, or in addition, the codebook may further define a first nonzero value and a second nonzero value for each of the first layer, the second layer, the third layer, and the fourth layer; and the at least one phase rotation may include at least one phase rotation of the first nonzero value and the second nonzero value for each of the third layer and the fourth layer.

In some aspects, the plurality of layers may include the first layer, a second layer, a third layer, a fourth layer, a fifth layer, and a sixth layer; where the first layer, the second layer, the third layer, the fourth layer, the fifth layer, and the sixth layer are each associated with a first tone, a second tone, a third tone, and a fourth tone; and where, for each tone of the first tone, the second tone, the third tone, and the fourth tone, the first layer is orthogonal to the sixth layer, the second layer is orthogonal to the fifth layer, and the third layer is orthogonal to the fourth layer. In this case, the first layer may be non-orthogonal to the second layer, the third layer, the fourth layer, and the fifth layer; the second layer may be non-orthogonal to the third layer, the fourth layer, and the sixth layer; the third layer may be non-orthogonal to the fifth layer and the sixth layer; the fourth layer may be non-orthogonal to the fifth layer and the sixth layer; and the fifth layer may be non-orthogonal to the sixth layer. In some aspects, at least one first phase rotation of the at least one phase rotation may be for the first tone and may be between the first layer, the second layer, and the third layer; a second phase rotation of the at least one phase rotation may be for the second tone and may be between the fourth layer and the fifth layer; a third phase rotation of the at least one phase rotation may be for the third tone and may be between the second layer and the fourth layer; and at least one fourth phase rotation of the at least one phase rotation may be for the fourth tone and may be between the third layer, the fifth layer, and the sixth layer.

For example, a first layer may be orthogonal to a second layer and non-orthogonal to a third layer. As another example, a first layer may be orthogonal to a second layer and a third layer may be non-orthogonal to a fourth layer. Other combinations are possible. In some aspects, the codebook defines phase rotation between the non-orthogonal layers and phase rotation is not applied between the orthogonal layers.

In some aspects, the process 1300 may include any combination of two or more of the above features.

Second Example Apparatus

Figure 14:
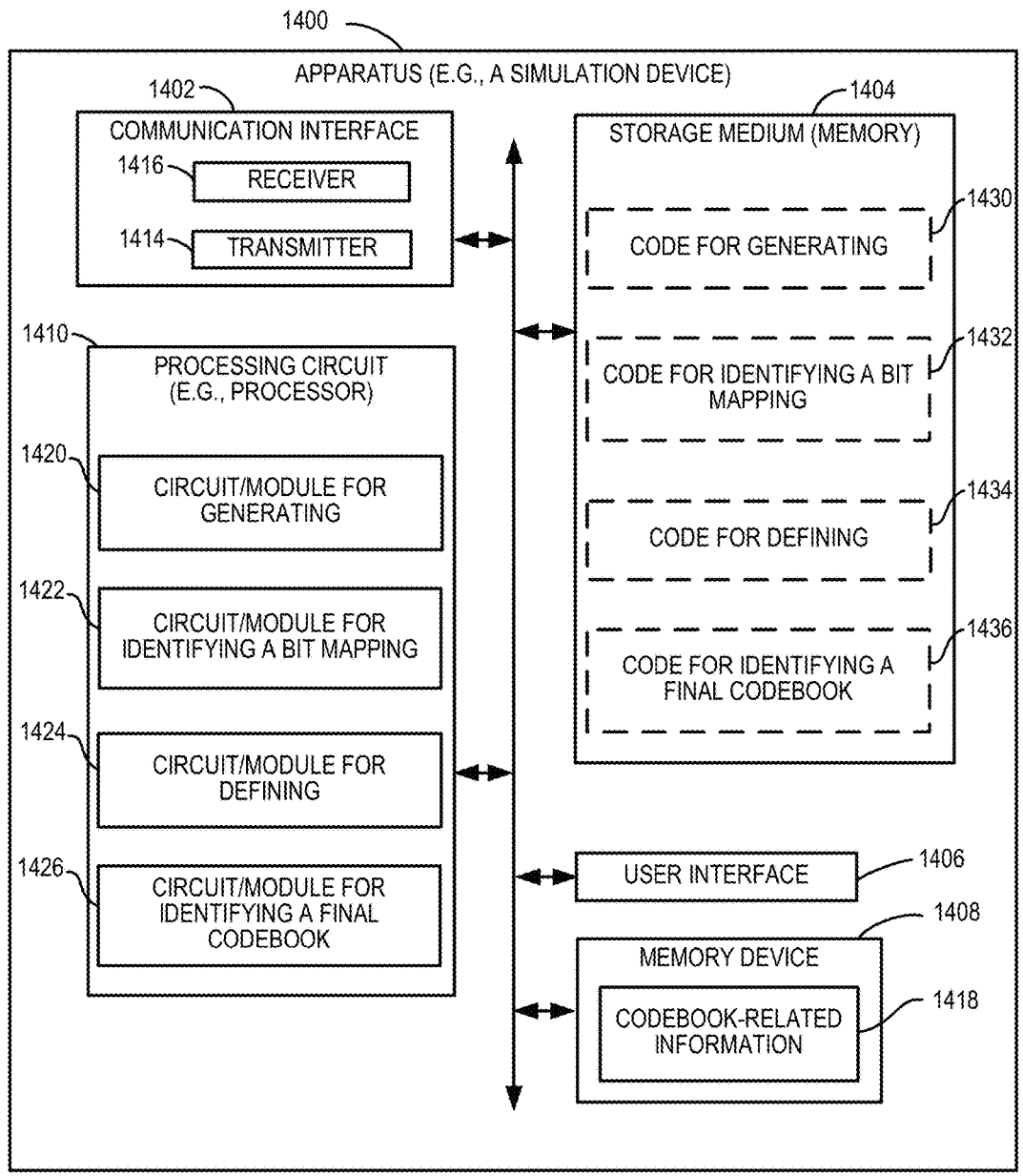
FIG. 14 is a block diagram illustrating an example hardware implementation for an apparatus (e.g., an electronic device) that generates a codebook in accordance with some aspects of the disclosure.

FIG. 14 illustrates a block diagram of an example hardware implementation of an apparatus 1400 configured to generate a codebook according to one or more aspects of the disclosure. The apparatus 1400 could embody or be implemented within an apparatus including a simulation device, a computer, a server, or some other type of device that supports codebook generation as taught herein. In various implementations, the apparatus 1400 could embody or be implemented within a server, a network entity, a portable computer, a server, a personal computer, a tablet, or any other electronic device having circuitry.

The apparatus 1400 includes a communication interface (e.g., at least one transceiver) 1402, a storage medium 1404, a user interface 1406, a memory device 1408 (e.g., storing codebook information 1418), and a processing circuit 1410 (e.g., at least one processor). In various implementations, the user interface 1406 may include one or more of: a keypad, a display, a speaker, a microphone, a touchscreen display, of some other circuitry for receiving an input from or sending an output to a user. The communication interface 1402 may include a transmitter 1414 and a receiver 1416. In general, the components of FIG. 14 may be similar to corresponding components of the apparatus 1000 of FIG. 10.

According to one or more aspects of the disclosure, the processing circuit 1410 may be adapted to perform any or all of the features, processes, functions, operations and/or routines for any or all of the apparatuses described herein. For example, the processing circuit 1410 may be configured to perform any of the steps, functions, and/or processes described with respect to FIGS. 1-9 and 15. As used herein, the term "adapted" in relation to the processing circuit 1410 may refer to the processing circuit 1410 being one or more of configured, employed, implemented, and/or programmed to perform a particular process, function, operation and/or routine according to various features described herein.

The processing circuit 1410 may be a specialized processor, such as an application specific integrated circuit (ASIC) that serves as a means for (e.g., structure for) carrying out any one of the operations described in conjunction with FIGS. 1-9 and 15. The processing circuit 1410 may serve as one example of a means for transmitting and/or a means for receiving. In various implementations, the processing circuit 1410 may incorporate, at least in part, the functionality of the system 800 of FIG. 8.

According to at least one example of the apparatus 1400, the processing circuit 1410 may include one or more of a circuit/module for generating 1420, a circuit/module for identifying a bit mapping 1422, a circuit/module for defining 1424, or a circuit/module for identifying a final codebook 1426. In various implementations, the circuit/module for generating 1420, the circuit/module for identifying a bit mapping 1422, the circuit/module for defining 1424, or the circuit/module for identifying a final codebook 1426 may provide, at least in part, the functionality described above for the system 800 of FIG. 8.

As mentioned above, programming stored by the storage medium 1404, when executed by the processing circuit 1410, causes the processing circuit 1410 to perform one or more of the various functions and/or process operations described herein. For example, the programming may cause the processing circuit 1410 to perform the various functions, steps, and/or processes described herein with respect to FIGS. 1-9 and 15 in various implementations. As shown in FIG. 14, the storage medium 1404 may include one or more of code for generating 1430, code for identifying a bit mapping 1432, code for defining 1434, or code for identifying a final codebook 1436. In various implementations, the code for generating 1430, the code for identifying a bit mapping 1432, the code for defining 1434, or the code for identifying a final codebook 1436 may be executed or otherwise used to provide the functionality described herein for the circuit/module for generating 1420, the circuit/module for identifying a bit mapping 1422, the circuit/module for defining 1424, or the circuit/module for identifying a final codebook 1426.

The circuit/module for generating 1420 may include circuitry and/or programming (e.g., code for generating 1430 stored on the storage medium 1404) adapted to perform several functions relating to, for example, generating a plurality of symbol error patterns by running a decoder process for each of a plurality of permutations of constellation points between nonzero entities for an encoder layer. In some aspects, the circuit/module for generating 1420 (e.g., a means for generating) may correspond to, for example, a processing circuit.

In some aspects, the circuit/module for generating 1420 may include functionality as described above for receiving signals, processing the signals to generating symbols error patterns, and outputting the symbol error patterns. For example, in some aspects, the circuit/module for generating 1420 may include functionality as described above in conjunction with FIGS. 8 and 9.

The circuit/module for identifying a bit mapping 1422 may include circuitry and/or programming (e.g., code for identifying a bit mapping 1432 stored on the storage medium 1404) adapted to perform several functions relating to, for example, identifying, for each of the symbol error patterns, a corresponding bit mapping that results in a lowest bit error. In some aspects, the circuit/module for identifying a bit mapping 1422 (e.g., a means for identifying a bit mapping) may correspond to, for example, a processing circuit.

In some aspects, the circuit/module for identifying a bit mapping 1422 may obtain the symbol error patterns (e.g., from the circuit/module for generating 1420, the memory device 1408, or some other component) and running tests for each of the bit mappings. The circuit/module for identifying a bit mapping 1422 may then output an indication of the identified bit mapping for each symbol error pattern (e.g., to the circuit/module for defining 1424, the memory device 1408, or some other component).

The circuit/module for defining 1424 may include circuitry and/or programming (e.g., code for defining 1434 stored on the storage medium 1404) adapted to perform several functions relating to, for example, defining a plurality of initial codebooks based on each permutation and each corresponding bit pattern. In some aspects, the circuit/module for defining 1424 (e.g., a means for defining) may correspond to, for example, a processing circuit.

In some aspects, the circuit/module for defining 1424 may obtain the identified bit mappings (e.g., from the circuit/module for identifying a bit mapping 1422, the memory device 1408, or some other component) and identify the corresponding permutation. The circuit/module for defining 1424 may then output an indication of each corresponding codebook (e.g., to the circuit/module for identifying a final codebook 1426, the memory device 1408, or some other component).

The circuit/module for identifying a final codebook 1426 may include circuitry and/or programming (e.g., code for identifying a final codebook 1436 stored on the storage medium 1404) adapted to perform several functions relating to, for example, identifying a final codebook by running a receiver process for each initial codebook and selecting one of the initial codebooks with a highest performance. In some aspects, the circuit/module for identifying a final codebook 1426 (e.g., a means for identifying a final codebook) may correspond to, for example, a processing circuit.

In some aspects, the circuit/module for identifying a final codebook 1426 may include functionality as described above for generating signals according to a particular codebook, processing the signals to determine the performance of the codebook, and comparing the performance of each codebook. For example, in some aspects, the circuit/module for identifying a final codebook 1426 may include functionality as described above in conjunction with FIGS. 8 and 9.

Fourth Example Process

Figure 15:
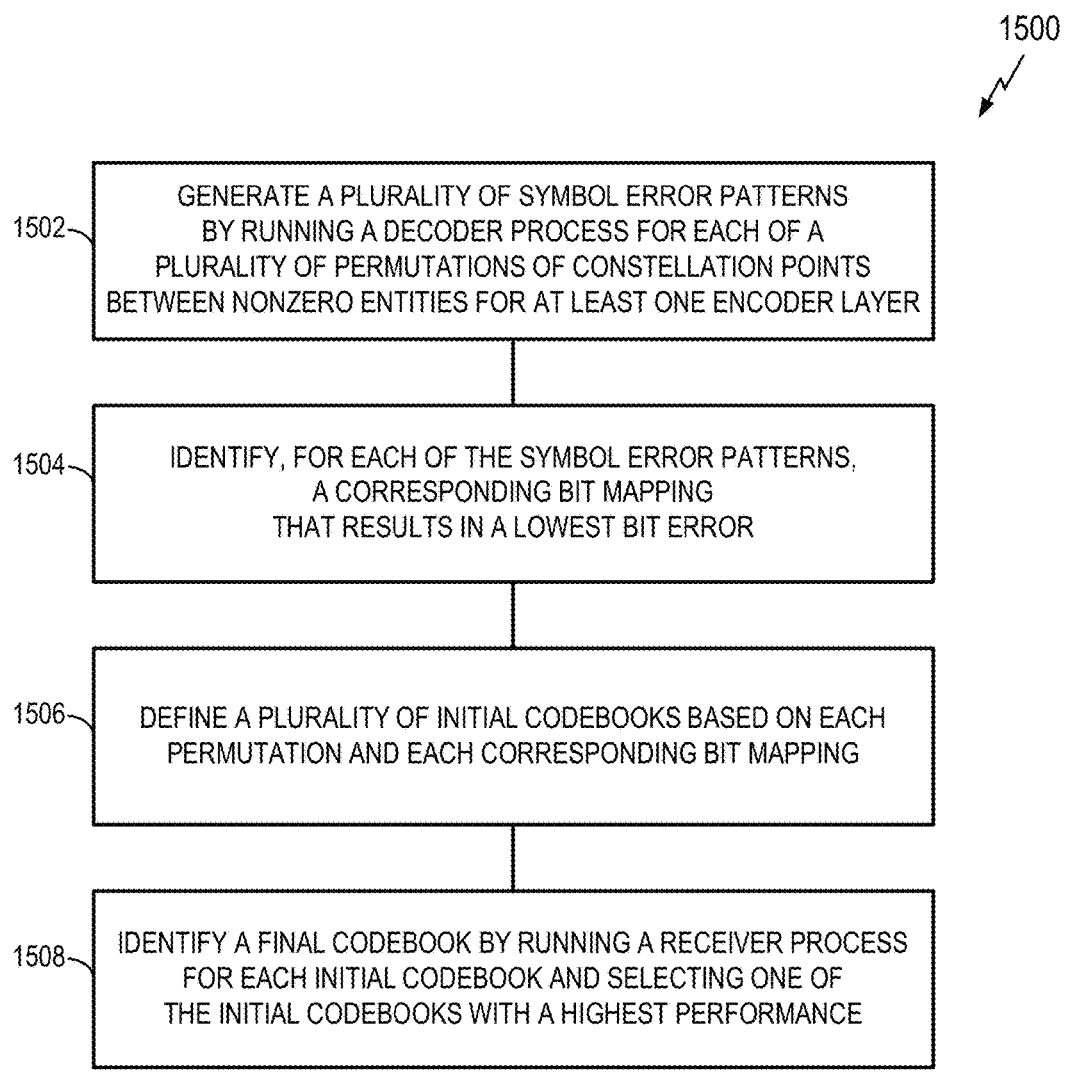
FIG. 15 is a flowchart illustrating an example of a codebook generation process in accordance with some aspects of the disclosure.

FIG. 15 illustrates a process 1500 for communication in accordance with some aspects of the disclosure. The process 1500 may take place within a processing circuit (e.g., the processing circuit 1410 of FIG. 14), which may be located in a simulation device, a computer, or some other suitable apparatus. Of course, in various aspects within the scope of the disclosure, the process 1500 may be implemented by any suitable apparatus capable of supporting codebook generation-related operations.

At block 1502, an apparatus (e.g., a simulation device) generates a plurality of symbol error patterns by running a decoder process for each of a plurality of permutations of constellation points between nonzero entities for at least one encoder layer. In some aspects, the decoder process may include a maximum likelihood (ML) decoder process.

In some implementations, the circuit/module for generating 1420 of FIG. 14 performs the operations of block 1502. In some implementations, the code for generating 1430 of FIG. 14 is executed to perform the operations of block 1502.

At block 1504, the apparatus identifies, for each of the symbol error patterns, a corresponding bit mapping that results in a lowest bit error. In some aspects, the bit error may include a minimum average bit error. In some aspects, the bit error may include a bit error rate.

In some implementations, the circuit/module for identifying a bit mapping 1422 of FIG. 14 performs the operations of block 1504. In some implementations, the code for identifying a bit mapping 1432 of FIG. 14 is executed to perform the operations of block 1504.

At block 1506, the apparatus defines a plurality of initial codebooks based on each permutation and each corresponding bit mapping. In some aspects, the defining of the plurality of initial codebooks may include, for each initial codebook, defining phase rotation between pairs of orthogonal layers of the initial codebook.

The initial codebooks may take different forms in different implementations. In some aspects, each codebook may be any of the codebooks described herein. In some aspects, each initial codebook may be a sparse code multiple access (SCMA) codebook. In some aspects, each initial codebook may define, for each layer of a plurality of layers, a mapping between input bits and multi-dimensional constellation points. In some aspects, each initial codebook may define, for each layer of a plurality of layers, a permutation of constellation points between each nonzero entry of the layer.

In some implementations, the circuit/module for defining 1424 of FIG. 14 performs the operations of block 1506. In some implementations, the code for defining 1434 of FIG. 14 is executed to perform the operations of block 1506.

At block 1508, the apparatus identifies a final codebook by running a receiver process for each initial codebook and selecting one of the initial codebooks with a highest performance. In some aspects, the receiver process may include a message passing algorithm (MPA)+Turbo receiver process.

In some implementations, the circuit/module for identifying a final codebook 1426 of FIG. 14 performs the operations of block 1508. In some implementations, the code for identifying a final codebook 1436 of FIG. 14 is executed to perform the operations of block 1508.

In some aspects, the process 1500 may include any combination of two or more of the above features.

Additional Aspects

The examples set forth herein are provided to illustrate certain concepts of the disclosure. Those of ordinary skill in the art will comprehend that these are merely illustrative in nature, and other examples may fall within the scope of the disclosure and the appended claims.

As those skilled in the art will readily appreciate, various aspects described throughout this disclosure may be extended to any suitable telecommunication system, network architecture, and communication standard. By way of example, various aspects may be applied to 3GPP 5G systems and/or other suitable systems, including those described by yet-to-be defined wide area network standards. Various aspects may also be applied to systems using LTE (in FDD, TDD, or both modes), LTE-Advanced (LTE-A) (in FDD, TDD, or both modes), Universal Mobile Telecommunications System (UMTS), Global System for Mobile Communications (GSM), Code Division Multiple Access (CDMA), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Various aspects may also be applied to UMTS systems such as W-CDMA, TD-SCDMA, and TD-CDMA. The actual telecommunication standard, network architecture, and/or communication standard used will depend on the specific application and the overall design constraints imposed on the system.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features, and/or functions illustrated in FIG. 1, 2, 3, 4, 5, 6, 7, 8, 9, 10, 11, 12, 13, 14, 15, or any combination thereof may be rearranged and/or combined into a single component, step, feature or function or embodied in several components, steps, or functions. Additional elements, components, steps, and/or functions may also be added without departing from the invention. The apparatus, devices, and/or components illustrated in FIG. 1, 2, 7, 8, 10, 14, or any combination thereof may be configured to perform one or more of the methods, features, or steps described in FIG. 3, 4, 5, 6, 9, 11, 12, 13, 15, or any combination thereof. The algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects.

Likewise, the term "aspect" does not require that all aspects include the discussed feature, advantage or mode of operation. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, or c or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication, comprising:
receiving a first input signal;
mapping the first input signal to a first layer of a plurality of layers defined by a codebook, wherein the plurality of layers comprise a plurality of pairs of orthogonal layers such that each pair of the plurality of pairs of orthogonal layers comprises two layers that are orthogonal to each other, and wherein the codebook further defines at least one phase rotation between at least a portion of the plurality of layers such that no phase rotation is defined for each layer of a first pair of the plurality of pairs of orthogonal layers and the same nonzero phase rotation value is defined for each layer of a second pair of the plurality of pairs of orthogonal layers;
generating a first coded signal for the first layer based on the codebook; and
generating an output signal based on the first coded signal.

2. The method of claim 1, wherein:
each pair of orthogonal layers is non-orthogonal to every other pair of orthogonal layers; and
the definition of at least one phase rotation between at least a portion of the layers comprises at least one definition of a nonzero phase rotation value for at least one of the pairs of orthogonal layers relative to at least another one of the pairs of orthogonal layers.

3. The method of claim 1, further comprising:
receiving a second input signal;
mapping the second input signal to a second layer of the plurality of layers; and
generating a second coded signal for the second layer based on the codebook,
wherein the generation of the output signal comprises combining the first coded signal and the second coded signal.

4. The method of claim 3, further comprising:
receiving a third input signal and a fourth input signal;
mapping the third input signal to a third layer of the plurality of layers;
mapping the fourth input signal to a fourth layer of the plurality of layers;
generating a third coded signal for the third layer based on the codebook; and
generating a fourth coded signal for the fourth layer based on the codebook,
wherein the generation of the output signal further comprises combining the third coded signal and the fourth coded signal with the first coded signal and the second coded signal.

5. The method of claim 4, wherein:
the first layer, the second layer, the third layer, and the fourth layer are each associated with a plurality of orthogonal resources; and
for each tone of the plurality of orthogonal resources, the first layer is orthogonal to the second layer and the third layer is orthogonal to the fourth layer.

6. The method of claim 5, wherein:
the first layer and the second layer comprise the first pair of the plurality of pairs of orthogonal layers;
the third layer and the fourth layer comprise the second pair of the plurality of pairs of orthogonal layers;
the first pair of the plurality of pairs of orthogonal layers is non-orthogonal to the second pair of the plurality of pairs of orthogonal layers; and
the at least one phase rotation is between the first pair of the plurality of pairs of orthogonal layers and the second pair of the plurality of pairs of orthogonal layers.

7. The method of claim 5, wherein:
the first layer is non-orthogonal to the third layer and the fourth layer;
the second layer is non-orthogonal to the third layer and the fourth layer;
a first phase rotation of the at least one phase rotation is between the first layer and the third layer; and
a second phase rotation of the at least one phase rotation is between the second layer and the fourth layer.

8. The method of claim 5, wherein:
the codebook further defines amplitude modulation for each of the first layer, the second layer, the third layer, and the fourth layer; and
the at least one phase rotation comprises at least one phase modulation for each of the third layer and the fourth layer.

9. The method of claim 5, wherein:
the codebook further defines a first nonzero value and a second nonzero value for each of the first layer, the second layer, the third layer, and the fourth layer; and the at least one phase rotation comprises at least one phase rotation of the first nonzero value and the second nonzero value for each of the third layer and the fourth layer.

10. The method of claim 1, wherein:
the plurality of layers comprises the first layer, a second layer, a third layer, a fourth layer, a fifth layer, and a sixth layer;
the first layer, the second layer, the third layer, the fourth layer, the fifth layer, and the sixth layer are each associated with a first tone, a second tone, a third tone, and a fourth tone; and
for each tone of the first tone, the second tone, the third tone, and the fourth tone, the first layer is orthogonal to the sixth layer, the second layer is orthogonal to the fifth layer, and the third layer is orthogonal to the fourth layer.

11. The method of claim 10, wherein:
the first layer is non-orthogonal to the second layer, the third layer, the fourth layer, and the fifth layer;
the second layer is non-orthogonal to the third layer, the fourth layer, and the sixth layer;
the third layer is non-orthogonal to the fifth layer and the sixth layer;
the fourth layer is non-orthogonal to the fifth layer and the sixth layer; and
the fifth layer is non-orthogonal to the sixth layer.

12. The method of claim 11, wherein:
at least one first phase rotation of the at least one phase rotation is for the first tone and is between the first layer, the second layer, and the third layer;
a second phase rotation of the at least one phase rotation is for the second tone and is between the fourth layer and the fifth layer;
a third phase rotation of the at least one phase rotation is for the third tone and is between the second layer and the fourth layer; and
at least one fourth phase rotation of the at least one phase rotation is for the fourth tone and is between the third layer, the fifth layer, and the sixth layer.

13. The method of claim 1, wherein the codebook further defines, for each of the layers, a mapping between input bits and multi-dimensional constellation points.

14. The method of claim 1, wherein the codebook further defines, for each of the layers, a permutation of constellation points between each nonzero entry of the layer.

15. The method of claim 1, wherein a given phase rotation of the at least one phase rotation is between 45 degrees and 75 degrees or between 105 degrees and 135 degrees.

16. The method of claim 1, wherein the codebook is a sparse code multiple access (SCMA) codebook.

17. An apparatus for communication, comprising:
a memory; and
a processor coupled to the memory,
the processor and the memory configured to:
receive a first input signal;
map the first input signal to a first layer of a plurality of layers defined by a codebook, wherein the plurality of layers comprise a plurality of pairs of orthogonal layers such that each pair of the plurality of pairs of orthogonal layers comprises two layers that are orthogonal to each other, and wherein the codebook further defines at least one phase rotation between at least a portion of the plurality of layers such that no phase rotation is defined for each layer of a first pair of the plurality of pairs of orthogonal layers and the same nonzero phase rotation value is defined for each layer of a second pair of the plurality of pairs of orthogonal layers;
generate a first coded signal for the first layer based on the codebook; and
generate an output signal based on the first coded signal.

18. The apparatus of claim 17, wherein:
each pair of orthogonal layers is non-orthogonal to every other pair of orthogonal layers; and
the definition of at least one phase rotation between at least a portion of the layers comprises at least one definition of a nonzero phase rotation value for at least one of the pairs of orthogonal layers relative to at least another one of the pairs of orthogonal layers.

19. The apparatus of claim 17, wherein:
the plurality of layers comprises the first layer, a second layer, a third layer, and a fourth layer;
the first layer, the second layer, the third layer, and the fourth layer are each associated with a plurality of orthogonal resources; and
for each tone of the plurality of orthogonal resources, the first layer is orthogonal to the second layer and the third layer is orthogonal to the fourth layer.

20. The apparatus of claim 19, wherein:
the first layer and the second layer comprise the first pair of the plurality of pairs of orthogonal layers;
the third layer and the fourth layer comprise the second pair of the plurality of pairs of orthogonal layers;
the first pair of the plurality of pairs of orthogonal layers is non-orthogonal to the second pair of the plurality of pairs of orthogonal layers; and
the at least one phase rotation is between the first pair of the plurality of pairs of orthogonal layers and the second pair of the plurality of pairs of orthogonal layers.

21. A non-transitory computer-readable medium storing computer-executable code, including code to:
receive a first input signal;
map the first input signal to a first layer of a plurality of layers defined by a codebook, wherein the plurality of layers comprise a plurality of pairs of orthogonal layers such that each pair of the plurality of pairs of orthogonal layers comprises two layers that are orthogonal to each other, and wherein the codebook further defines at least one phase rotation between at least a portion of the plurality of layers such that no phase rotation is defined for each layer of a first pair of the plurality of pairs of orthogonal layers and the same nonzero phase rotation value is defined for each layer of a second pair of the plurality of pairs of orthogonal layers;
generate a first coded signal for the first layer based on the codebook; and
generate an output signal based on the first coded signal.

* * * * *